(12) United States Patent
Ohno

(10) Patent No.: US 7,861,160 B2
(45) Date of Patent: Dec. 28, 2010

(54) LAYING OUT IMAGES IN FIELDS, LINKING THE FIELDS, AND CALCULATING DISTANCE BEFORE AND AFTER IMAGE ROTATION

(75) Inventor: Hajime Ohno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1364 days.

(21) Appl. No.: 11/346,178

(22) Filed: Feb. 3, 2006

(65) Prior Publication Data

US 2006/0190811 A1 Aug. 24, 2006

(30) Foreign Application Priority Data

Feb. 4, 2005 (JP) .............................. 2005-029831

(51) Int. Cl.
  *G06F 17/24* (2006.01)
(52) U.S. Cl. ...................................... 715/244; 715/243
(58) Field of Classification Search ......... 715/243–252, 715/764, 799
See application file for complete search history.

(56) References Cited

U.S. PATENT DOCUMENTS 6,879,943 B1    4/2005  Shigemori
7,028,258 B1 *  4/2006  Thacker et al. .............. 715/209
2003/0123853 A1 7/2003  Iwahara et al.

FOREIGN PATENT DOCUMENTS

| JP | 08-320916 | 12/1996 |
|----|-----------|---------|
| JP | 10-257296 | 9/1998 |
| JP | 2000-48216 | 2/2000 |
| JP | 2000-200270 | 7/2000 |
| JP | 2000-222493 | 8/2000 |
| JP | 2002-158861 | 5/2002 |
| JP | 2003-264783 | 9/2003 |

* cited by examiner

*Primary Examiner*—Cesar B Paula
(74) *Attorney, Agent, or Firm*—Fitzpatrick, Cella, Harper & Scinto

(57) ABSTRACT

Setting for detecting a region of interest from data to be inserted into a field region in a page is performed. When target data is inserted into the field region, a region of interest in the data is detected in accordance with the setting. a size of the destination field region is adjusted, to which the data of the region of interest be inserted, on the basis of the size of the region of interest, and the data of the region of interest in the destination field region in the page is lie out.

3 Claims, 29 Drawing Sheets

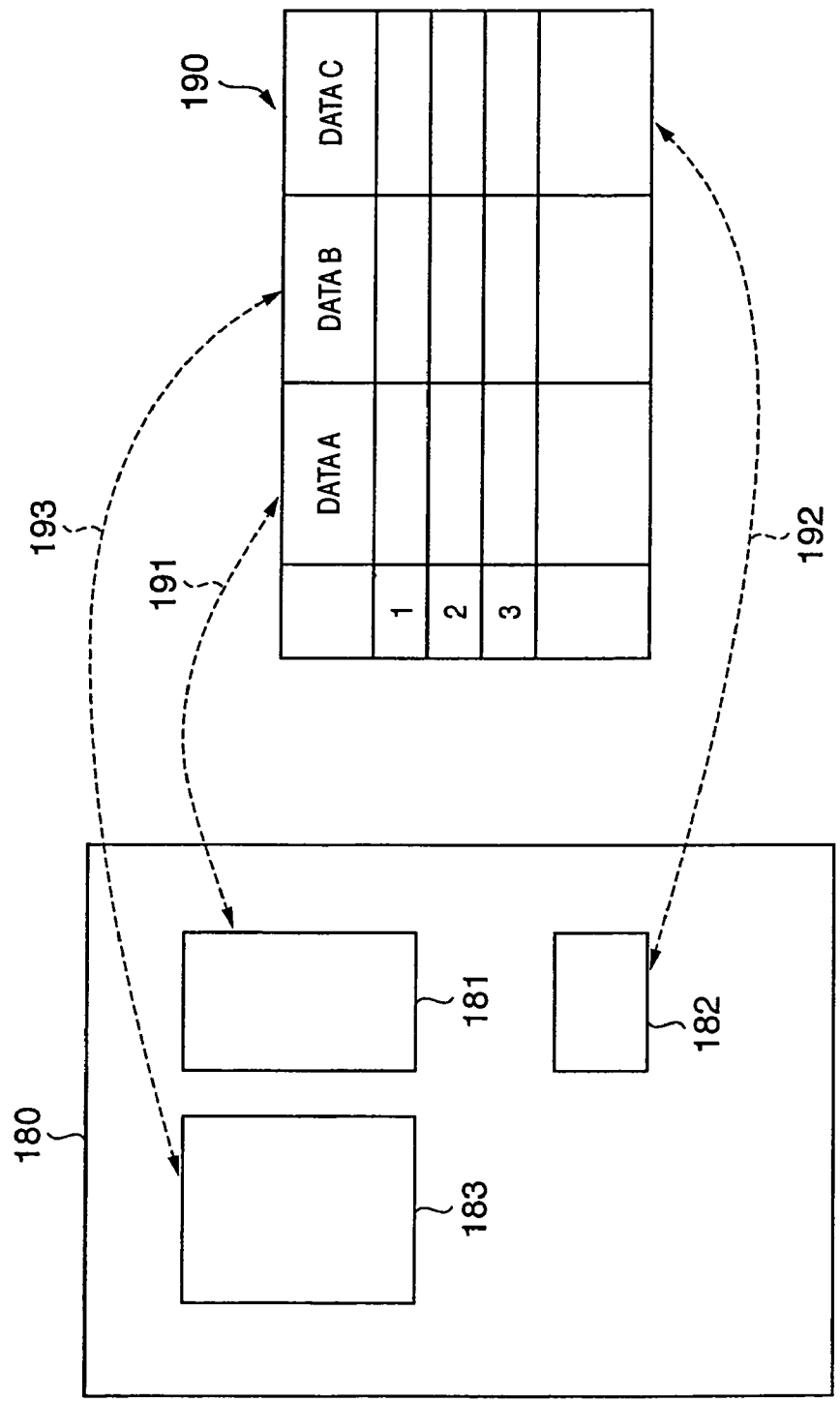

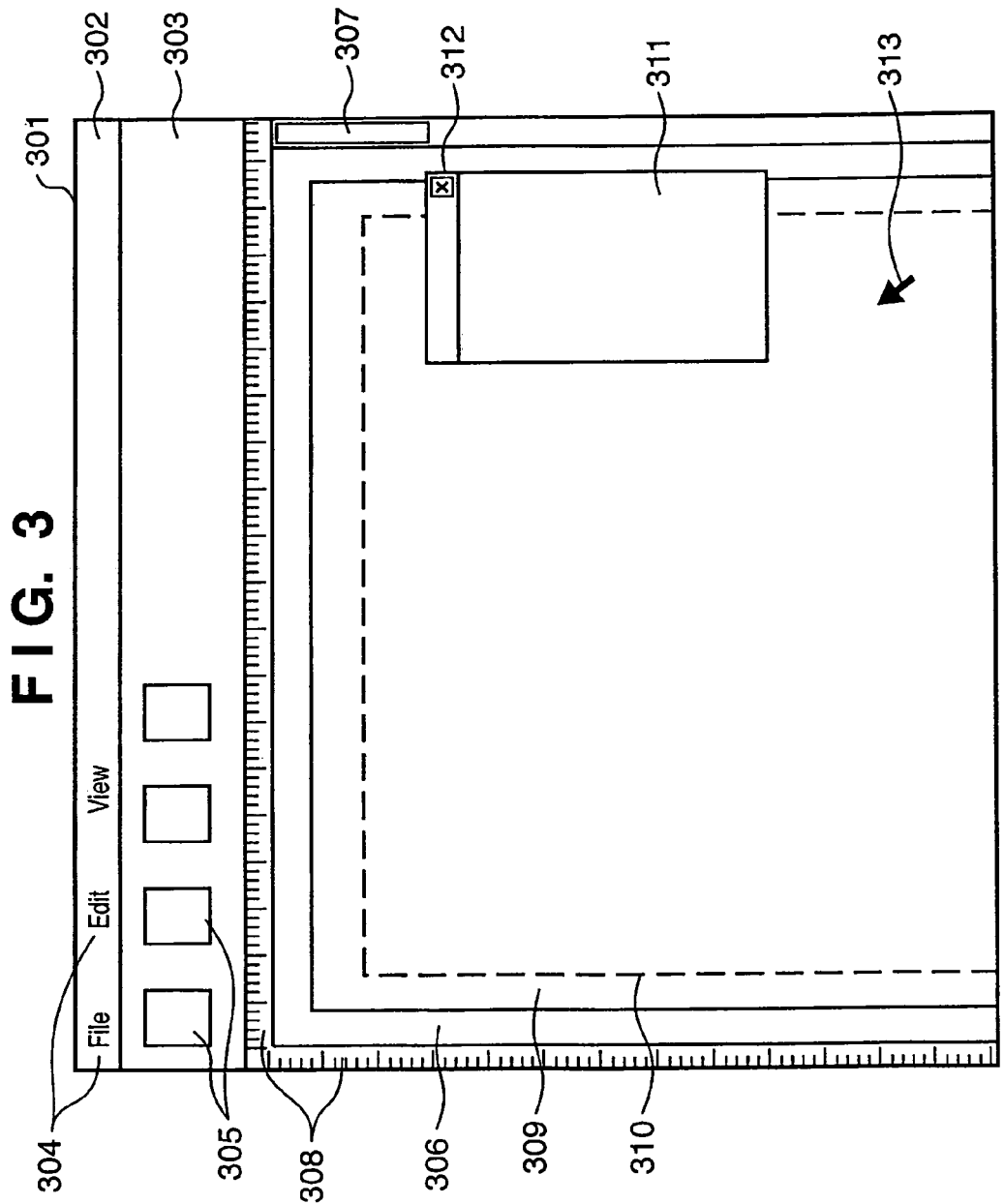

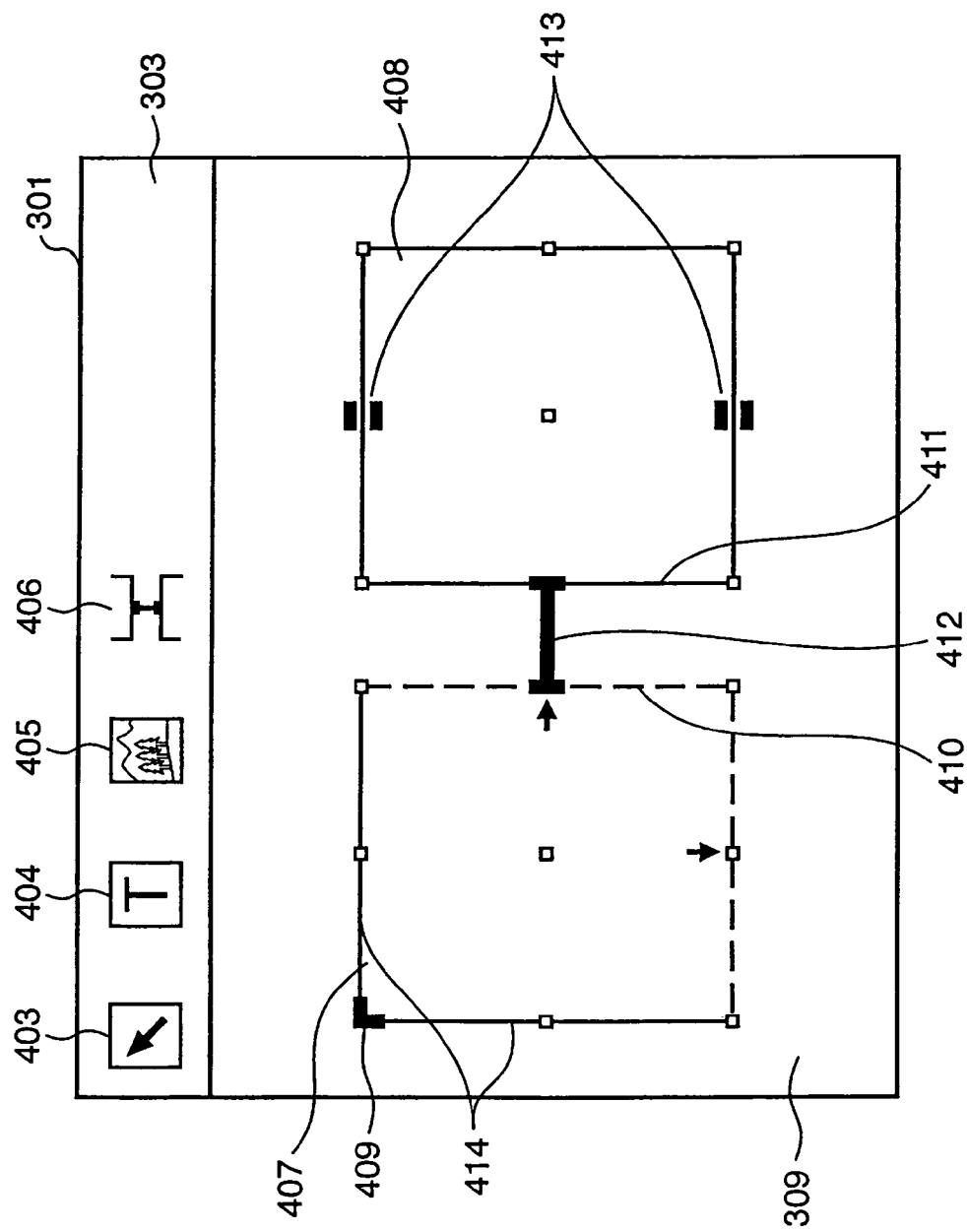

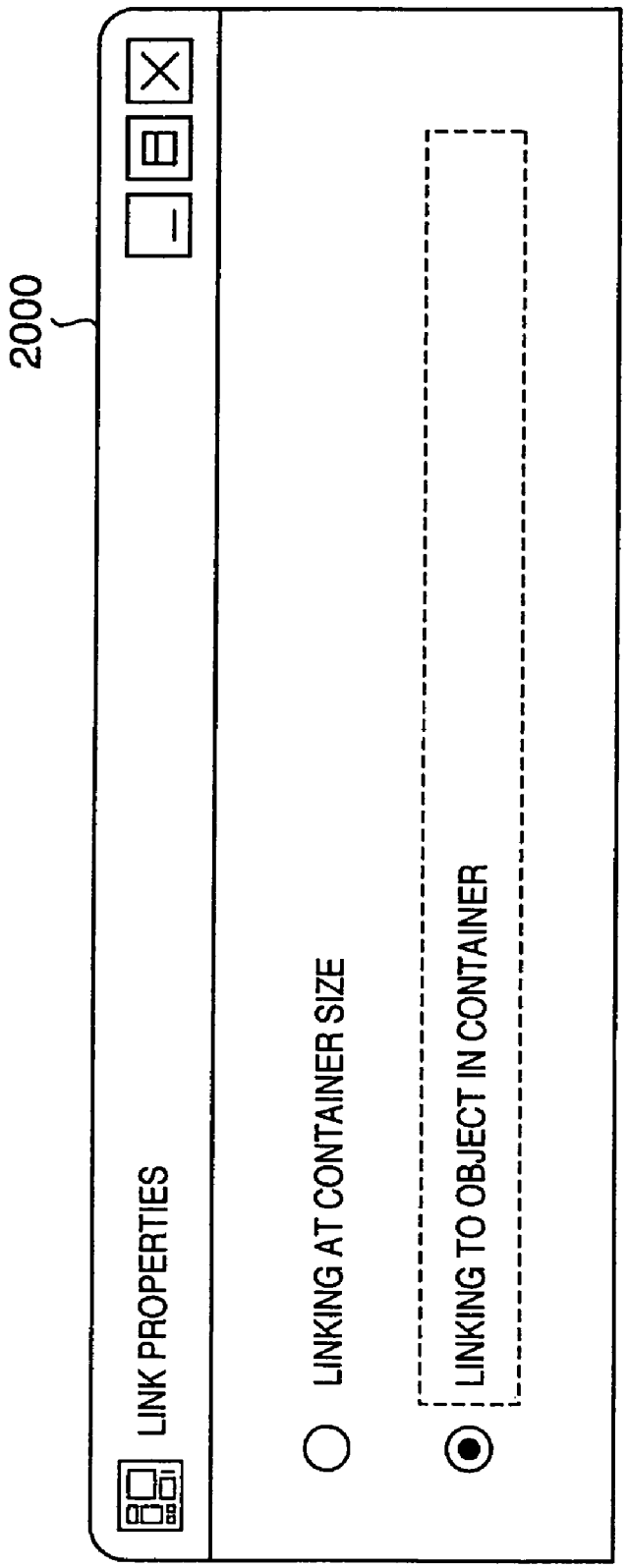

F I G. 26
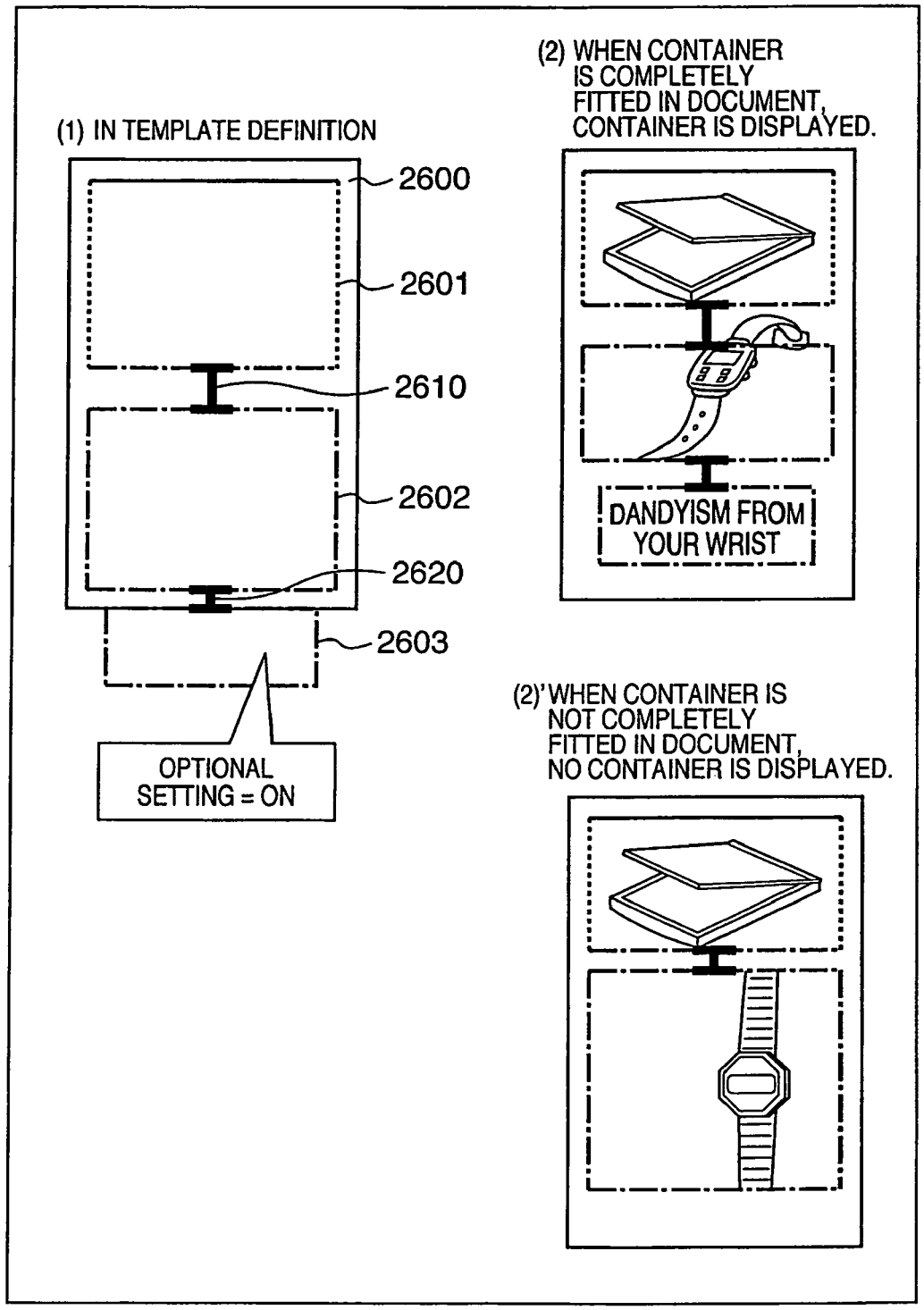

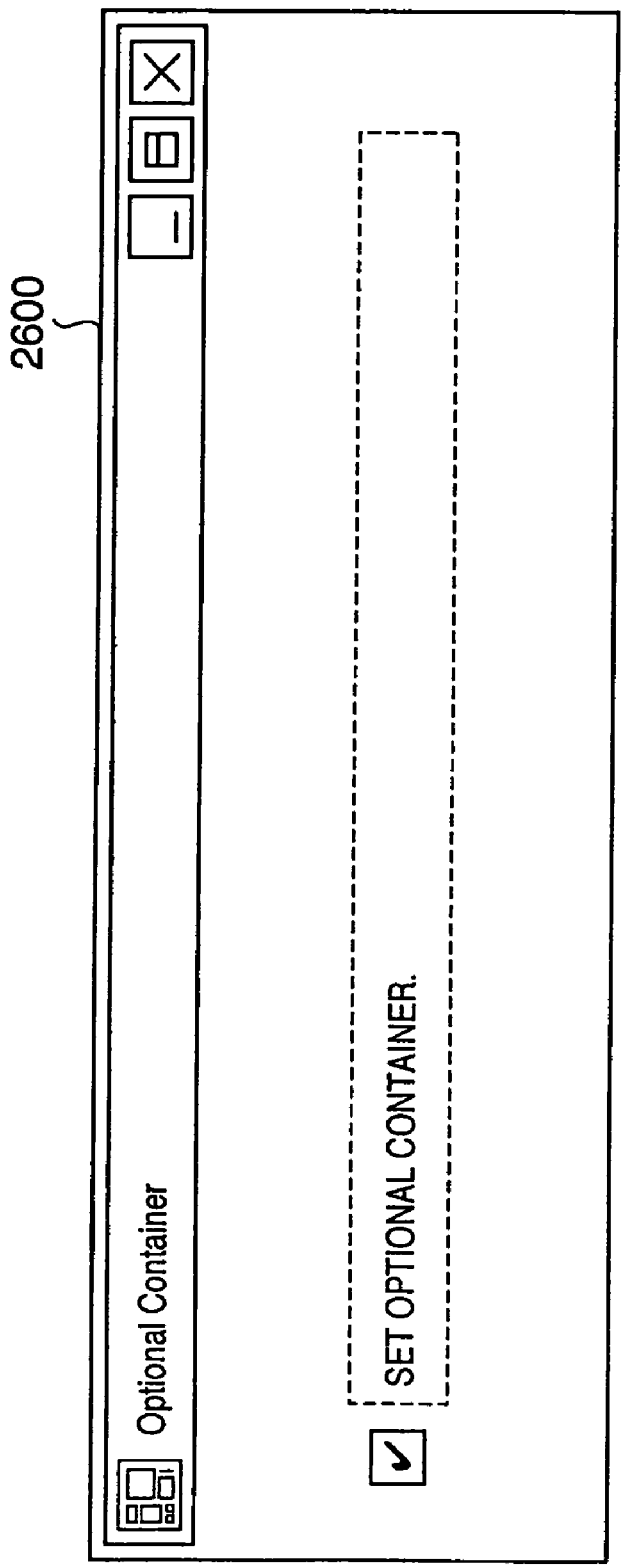

LAYING OUT IMAGES IN FIELDS, LINKING THE FIELDS, AND CALCULATING DISTANCE BEFORE AND AFTER IMAGE ROTATION

FIELD OF THE INVENTION

The present invention relates to an information processing apparatus which lays out, in a page, field regions for inserting data of data fields that are selected from a record containing a plurality of types of data fields, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise the customer satisfaction, win new customers, and keep customers.

One-to-one marketing is a kind of database marketing which creates a database of individual attribute information including the age, gender, hobby, preference, and purchase log of a customer, analyzes the contents of the database, and makes a proposal complying with customer's needs. A typical method of this marketing is variable printing. These days, a variable printing system which customizes a document for each customer and outputs the document has been developed along with the development of the DTP (Desk Top Publishing) technique and the proliferation of digital printing apparatuses. The variable printing system needs to create a customized document in which contents different for respective customers are laid out.

Generally, when such a customized document is to be created by the variable printing system, containers are laid out in a document. The container is a drawing region for drawing contents (drawing contents (e.g., an image and text)), and is also called a field region.

A desired customized document (called a document template) can be created by laying out containers in a document and associating a database with the layout (associating various contents in the database with the containers). The contents of the customized document can be changed (made variable) by properly switching contents in the containers in the customized document for each record in the database. Such a document is called a variable data document, and a print system using the variable data document is a variable printing system. As a method of creating a variable printing template, a form creation application has conventionally been proposed (e.g., Japanese Patent Laid-Open No. 2000-222493).

In a conventional variable printing system, the size of a container associated with a text or image serving as contents is fixed. When contents in the database are inserted (flowed) into a container and the data amount is larger than the container size, the following problems arise. That is, if the data is a text, overlapping of the text occurs. If the data is an image, clipping of the image by the container occurs, and part of the image is lost. When the data amount is smaller than the container size, no proper display may be obtained such that a gap appears between the container and its internal contents.

There is also known a technique of, when a text to be inserted into a container of a fixed container size cannot be fully fitted in the container, changing (in this case, reducing) the font size of the text to display all the text in the container. However, if a container enlarges in accordance with contents to be inserted in an environment where the container size is flexible, the container overlaps another container in the same document. If the data amount of a text to be inserted is excessively large in an environment where the font size is flexible, the font size is reduced excessively.

As another automatic layout technique which solves these problems, a "Layout Designing Apparatus" is disclosed in Japanese Patent Laid-Open No. 2000-48216. In this reference, when the data amount to be inserted into a given container (image component block) becomes large, the layout position of the next container (image component block) to be laid out is changed. If data cannot be fully inserted in a container, it is moved to the next container (image component block) to be laid out.

In the conventional variable printing system, a multi-record technique of laying out multiple records in one document is also known in addition to a technique of laying out one record in one document. The multi-record technique makes it possible to change the number of laid-out data for one customer, and create a document customized for each customer.

In, however, the variable printing system disclosed in Japanese Patent Laid-Open No. 2000-48216, the layout order is determined in advance as an order of data to be flowed. The layout is decided by laying out data one by one in accordance with the layout order. If the data amount to be flowed is large (the data size of each data is large), data of a low layout order is assigned with a small layout region and may not be laid out.

In order to solve this problem, a dynamic layout system has been devised. The dynamic layout system flexibly sets the container size of a container laid out in a document, and links (associates) flexibly set containers to each other. With this setting, the linked containers push each other and make their loads equal, deciding the container positions and sizes. Software which implements the dynamic layout system can change the size of each container in accordance with the relationship between each container and the data amount inserted into the container.

Of such dynamic layout systems, particularly a system which publishes leaflets, brochures, and the like needs to insert many pieces of product information in one page. When the dynamic layout system executes layout, it always processes a content image acquired from a database as a rectangular image, and calculates the sizes and positions of flexible-size containers from the data size of the image. The dynamic layout system performs a layout decision process under the following constraints.

(1) No content is considered.
(2) A content image is always processed as a rectangular one.
(3) Only simple scaling operation is done.

Under these constraints, even a margin other than a main object is subjected to dynamic layout. When an object of interest is not rectangular to a content image or is formed small to the entire size of the content image, the following problems occur.

(A) A main object in a content image is displayed and printed small.
(B) To prevent this, the content creator must delete an unnecessary margin in advance from contents to be created.
(C) It is difficult to increase the information density per sheet surface area.

SUMMARY OF THE INVENTION

The present invention has been made to overcome the conventional drawbacks, and has as its object to provide an information processing apparatus capable of preferably, easily laying out contents in a page, a control method therefor, and a program.

According to the present invention, the foregoing object is attained by providing an information processing apparatus which lays out, in a page, field regions for inserting data of data fields selected from a record containing a plurality of types of data fields, comprising:

setting means for performing setting for detecting a region of interest from data to be inserted into a field region in the page;

detection means for detecting a region of interest in the data in accordance with the setting by the setting means, when target data is inserted into the field region; and layout means for adjusting a size of the destination field region, to which the data of the region of interest be inserted, on the basis of the size of the region of interest detected by the detection means, and laying out the data of the region of interest in the destination field region in the page.

In a preferred embodiment, the detection means detects the region of interest in the data by detecting a margin region in data to be processed that is decided on the basis of a background color of the page.

In a preferred embodiment, the setting by the setting means includes setting for detecting the margin region in the data to be processed that is decided on the basis of the background color of the page, and thereby detecting the region of interest in the data.

In a preferred embodiment, the detection means detects a line segment which is obtained by scanning an image perpendicularly to a direction from each edge of data of a rectangular region to an opposite edge. The opposite edge contains a pixel at which a color other than colors in a predetermined color range including the background color of the page is detected first, and is parallel to an edge at which scanning starts. The detection means also detects, as the region of interest, a rectangular region surrounded by line segments detected by scanning edges. Further, the margin region includes a region except the region of interest detected from the data of the rectangular region.

In a preferred embodiment, the apparatus further comprises creation means for creating a link which associates field regions in the page, wherein the setting by the setting means includes setting for detecting margin regions present on sides of the link from data to be inserted into the respective field regions connected by the link, and thereby detecting regions of interest in the data to be inserted into the respective field regions.

In a preferred embodiment, the detection means scans an image for each predetermined line segment perpendicularly to a direction from an edge on a side of the link among edges of data of a rectangular region to an opposite edge, detects, by scanning along each line segment, a line segment region up to a pixel at which a color other than the colors in the predetermined color range including the background color of the page is detected first, detects, as a margin region, a region defined by line segment regions detected by respective scanning operations, and detects a region except the margin region as a region of interest.

In a preferred embodiment, the layout means searches for a minimum distance at which a distance between regions of interest respectively inserted into the field regions connected by the link becomes minimum, and changes positions of the field regions connected by the link on the basis of the minimum distance.

In a preferred embodiment, the setting by the setting means further includes setting for rotating the region of interest through an arbitrary angle in the destination field region.

In a preferred embodiment, when either of the field regions connected by the link has a setting for rotating the region of interest through an arbitrary angle, the layout means searches for a first minimum distance and a second minimum distance at which the distance between the regions of interest respectively inserted into the field regions connected by the link becomes minimum before and after rotating the regions of interest respectively inserted into the field regions having the rotation setting, and changes positions of the field regions connected by the link on the basis of a shorter minimum distance among the first minimum distance and the second minimum distance.

In a preferred embodiment, the setting by the setting means further includes a setting for controlling display of the field region to be laid out by the layout means and display of data to be inserted into the field region, and when the setting for controlling the display is made, the layout means inhibits display of the field region which is not fitted in the page, and display of the data to be inserted into the field region.

According to the present invention, the foregoing object is attained by providing a method of controlling an information processing apparatus which lays out, in a page, field regions for inserting data of data fields selected from a record containing a plurality of types of data fields, comprising:

a setting step of performing setting for detecting a region of interest from data to be inserted into a field region in the page;

a detection step of detecting a region of interest in the data in accordance with the setting in the setting step, when target data is inserted into the field region; and a layout step of adjusting a size of the destination field region, to which the data of the region of interest be inserted, on the basis of the size of the region of interest detected in the detection step, and laying out the data of the region of interest in the destination field region in the page.

According to the present invention, the foregoing object is attained by providing a program for implementing control of an information processing apparatus which lays out, in a page, field regions for inserting data of data fields selected from a record containing a plurality of types of data fields, comprising:

a program code for a setting step of performing setting for detecting a region of interest from data to be inserted into a field region in the page;

a program code for a detection step of detecting a region of interest in the data in accordance with the setting in the setting step, when target data is inserted into the field region; and a program code for a layout step of adjusting a size of the destination field region, to which the data of the region of interest be inserted, on the basis of the size of the region of interest detected in the detection step, and laying out the data of the region of interest in the destination field region in the page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining an outline of variable data printing according to the first embodiment of the present invention;

FIG. 3 is a view showing an example of a user interface according to the first embodiment of the present invention;

FIG. 4 is a view showing an example of display of a container in the user interface according to the first embodiment of the present invention;

FIG. 20 is a view showing an example of a margin ignoring setting property dialog according to the second embodiment of the present invention;

FIG. 26 is a view for explaining a concrete example of the process executed by the variable printing system according to the fourth embodiment of the present invention; and FIG. 27 is a view showing an example of an optional property dialog according to the fourth embodiment of the present invention.

DETAILED DESCRIPTION OF THE PREFERRED EMBODIMENTS

Preferred embodiments of the present invention will be described in detail in accordance with the accompanying drawings.

First Embodiment

<System Configuration>

The hardware configuration of an information processing system and that of a host computer as a building component of the information processing system according to the first embodiment will be described with reference to FIGS. 1A and 1B.

Figure 1A:
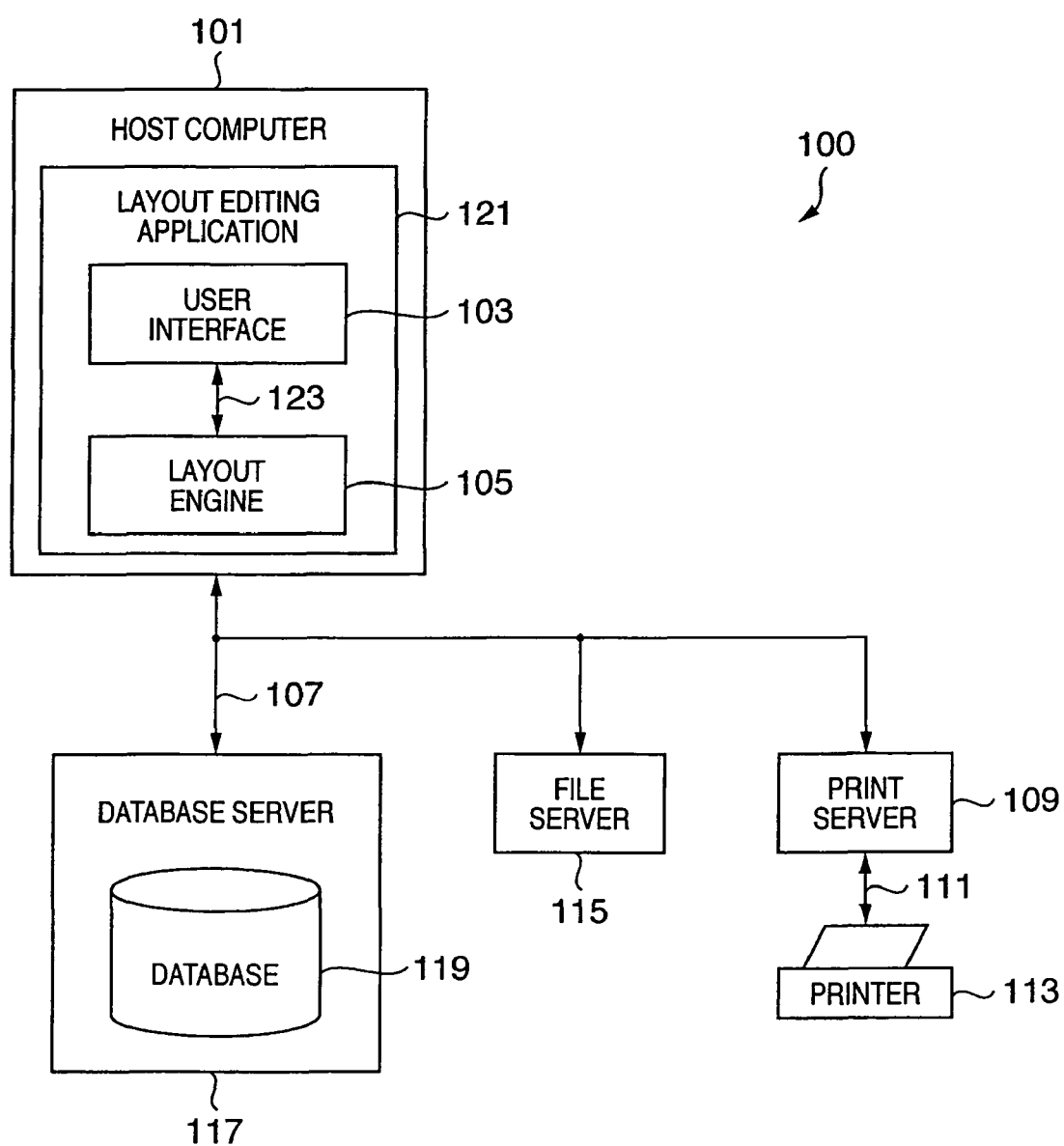
FIG. 1A is a block diagram showing an example of the configuration of an information processing system according to the first embodiment of the present invention.

FIG. 1A is a block diagram showing an example of the configuration of the information processing system according to the first embodiment of the present invention. FIG. 1B is a block diagram showing the hardware configuration of the host computer (corresponding to an information processing apparatus according to the present invention) as a building component of the information processing system according to the first embodiment of the present invention.

Figure 1B:
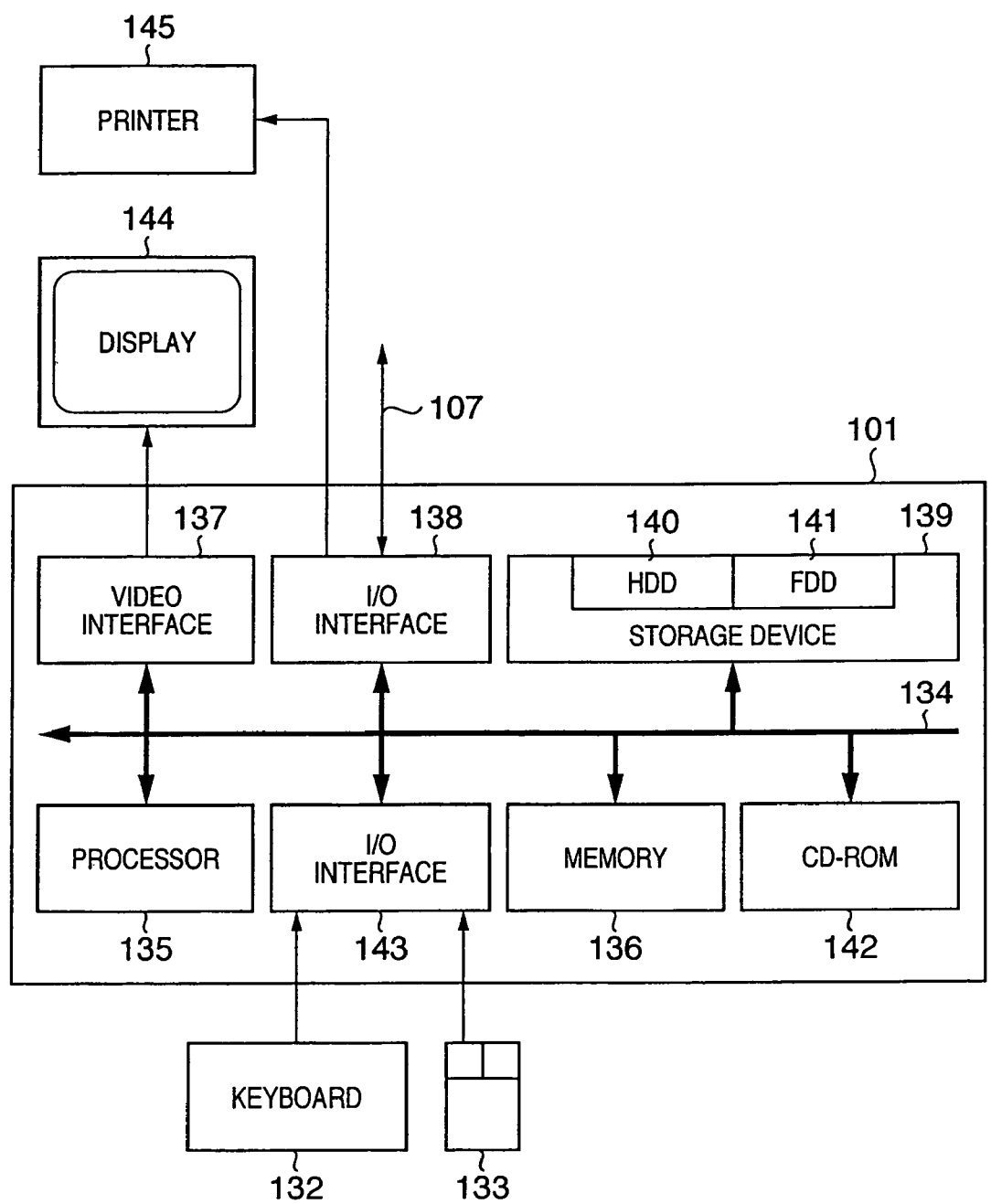
FIG. 1B is a block diagram showing the hardware configuration of a host computer as a building component of the information processing system according to the first embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the first embodiment is implemented by the host computer 101 (formed from a general-purpose computer module) which functions as a layout editing apparatus.

The layout editing apparatus can execute a dynamic layout process. In this process, the position and size of each container are dynamically decided under constraints on the amount and size of contents and association between containers in variable output (printing or preview display), which will be described later.

A layout editing application 121 which can run in the variable printing system 100 is executed completely or partially by the host computer 101. In particular, a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

In the first embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or floppy® disk. This program is loaded into the host computer 101 via the corresponding CD-ROM drive 142 or floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, a magneto-optical disk, radio communication (e.g., infrared communication) between the host computer 101 and another device, a computer-readable card (e.g., a PCMCIA card), or another proper computer including e-mail communication, an intranet, or the Internet having recording information on a WEB site. These are examples of the computer-readable medium, and another computer-readable medium obviously may be used.

In FIG. 1A, the layout editing application 121 causes the host computer 101 to implement variable printing (to be also referred to as variable data printing (VDP)), and includes two software components: a layout engine 105 and user interface 103.

The layout engine 105 is a software component for loading records one by one from variable data which are stored as records in the database 119, under constraints on size and position given to a container (rectangular range) serving as a field region (partial region), and calculating, from the loaded variable data and the container constraints, the layout including the size and position of a container to which the loaded variable data is flowed.

In the first embodiment, the layout engine 105 also performs a process of drawing variable data assigned to a container and generating an image of a variable data document. However, the present invention is not limited to this, and the layout engine 105 operates as an application which decides the size and position of each partial region (container) and outputs drawing information to a printer driver (not shown). The printer driver may perform a variable data document image drawing process and generate print data.

The user interface 103 allows the user to set the layout and attribute of a container and create a document template (also called template information). The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data. The variable data document is directly printed by the printer 113 via the local file system of the host computer 101, the file server 115, or the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
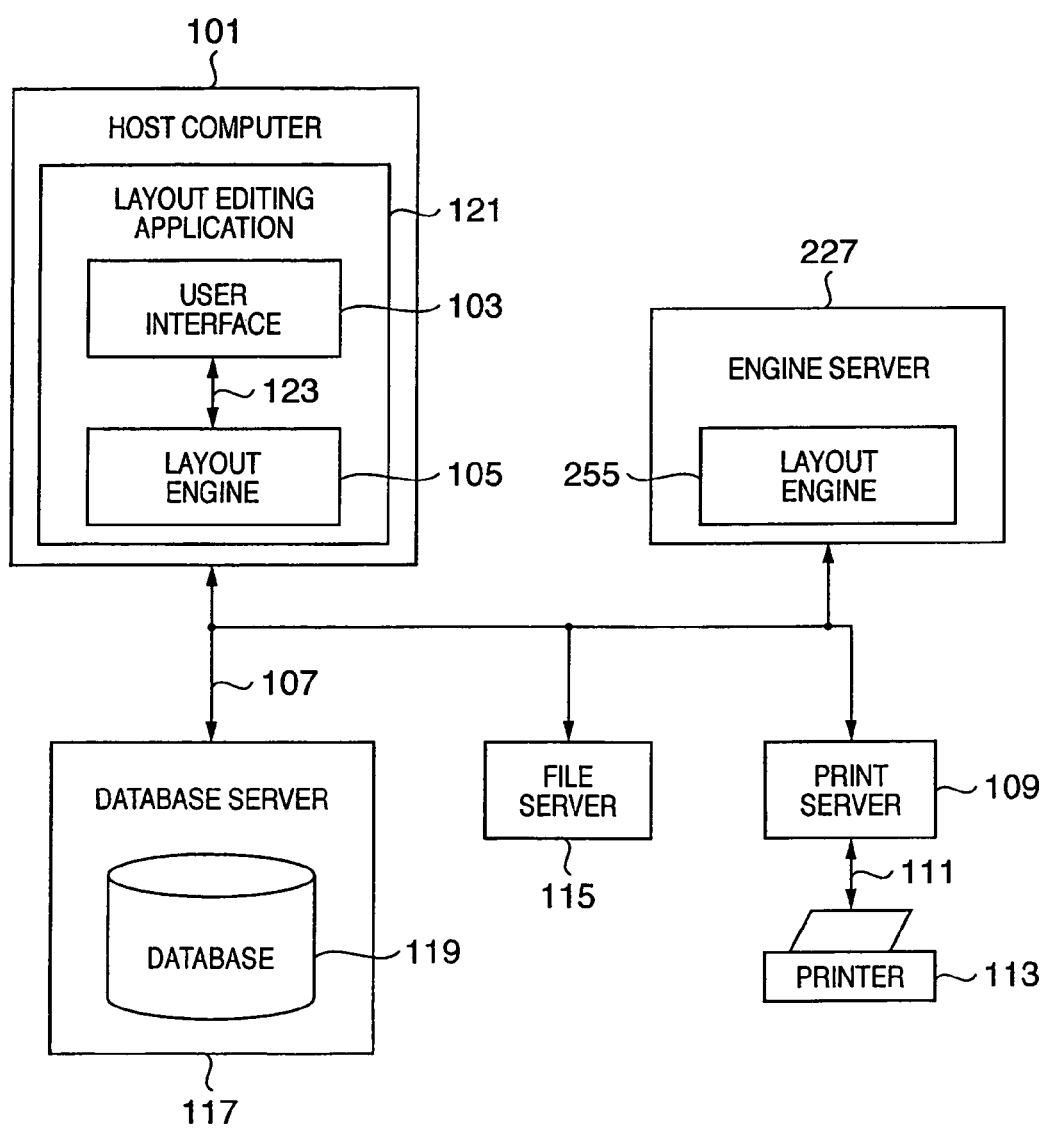
FIG. 1C is a block diagram showing another example of the configuration of the information processing system according to the first embodiment of the present invention.

FIG. 1C is a block diagram showing another configuration of the information processing system according to the first embodiment of the present invention.

FIG. 1C illustrates an example in which an engine server 227 is added to the network 107 and a layout engine 255 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be connected to data saved in the database 119 in order to generate a document by the layout engine 255 for printing or another purpose. Such operation is requested via the user interface 103 or so requested as to print only a specific record.

<Outline of Layout Editing Application>

An outline of variable data printing will be explained with reference to FIG. 2.

FIG. 2 is a view for explaining an outline of variable data printing according to the first embodiment of the present invention.

A plurality of containers 181 to 183 are laid out on a page in accordance with an operation instruction from the user via the user interface 103 of the layout editing application 121, and constraints on position and size are assigned to the containers to generate a document template 180.

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed content data.

For a preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3.

[Main Window]

FIG. 3 is a view showing an example of the user interface according to the first embodiment of the present invention.

As shown in FIG. 3, the user interface 103 displays on the display device 144 a user interface which is formed by an application window 301 upon operation. The application window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be displayed/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can decide a basic layout by laying out containers and links in a page. The basic layout is a base for variable data printing. When each container in the basic layout is a fixed layout, the print results of all records have the same layout.

When each container in the basic layout is a flexible container (to be described later), the size and position of the container change in accordance with the amount and size of data loaded from each record under constraints (to be described later). Hence, a document template created by the layout editing application 121 decides only the basic layout. When the document template contains a flexible container, the layout of a finally printed material is adjusted in accordance with loaded data.

[Document Template]

In FIG. 3, the work area 306 is used to display and edit the design of the document template (180: basic layout). The work area 306 can present a basic outline of a document to be printed to the user while the user designs an outline of a document template. A document template to be created has a layout desired by the user. A calculated layout changes between records because the variable printing system dynamically decides the layout in accordance with the amount and size of content data.

From a comparison between the document template and the preview after dynamic layout calculation, the user can understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on variable data in an associated data source. This is because an additional page is automatically created upon loading variable data which cannot be fitted in one page when a field that changes in size depending on the variable data amount, like a flexible table, is set in the document template.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container.

The link 412 represents that the containers 407 and 408 are associated, though details of the link 412 will be described later. The link 412 also represents that the container 408 can be moved to the right while maintaining a length (range can be specified) set for the link 412. The slider 413 shows that it can be moved parallel to an edge at which the slider 413 is set.

[Container]

A container serving as a field region for inserting data of a plurality of types of data fields contained in each record in the database will be explained.

The container is a field region (to be referred to as a partial region) where a fixed or flexible text and image (data in a plurality of types of data fields) are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has container attributes representing the position, the maximum, minimum, design sizes, the maximum and minimum font sizes of contents to be merged, and whether each edge is fixed/flexible. All the definitions of the container attributes in the first embodiment will be described.

(1) A container has fixed or flexible contents. Flexible contents (variable data) are dynamic in the sense that data acquired from the data source may change for each document, i.e., each record. Note that flexible contents in the first embodiment are not intended to be animated contents or contents which change over time by another method because these contents are not suitable for printing.

Similarly, fixed contents are displayed in the same way for all documents generated using containers. When, however, a link to flexible contents is set, fixed contents may change in position in each document under the influence of the flexible contents. Contents to be merged with containers change between records, and the display contents also change.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite count representing container operation when a container is merged with data from the data source, a line, an icon, and a text.

[Container Constraints]

The container has constrains on controlling how to link contents displayed in each document. These constraints (including linking of fixed/flexible contents to a container) are a major method of controlling generation of many documents from one document template by the user.

An example of the constraints is "the height of contents in this container is 4 inches at maximum." Another example of the constraints is "the left edge of contents in the container must be displayed at the same horizontal position in respective documents." The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in a region in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, the term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When a corner position of a container, an intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial region). The user can create a desired basic layout when he decides the basic layout of the document template 180.

[Display and Editing of Container]

—Method of Creating New Container—

A container is described as either of two, text and image containers. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container), a handle 502 (control point drawn on or near the edge of a region for movement and modification), the slider 413 (short parallel lines drawn on the two sides of an edge: see FIG. 4), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted in drawing lines.

The place at which a flexible edge is drawn depends on the contents of a container. As will be described later, a "dynamic calibration process" is employed which means that contents are merged into a document template and visualized on a user interface. Alternative execution can be achieved by another means for deciding where a flexible edge is laid out in a user interface or in the content region of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container only assist in designing a document template, and are not drawn on a printed material.

As described above, settings of a basic pattern such as the default, minimum, and maximum values of the width and height of a container are displayed in a secondary dialog window.

Figure 5A:
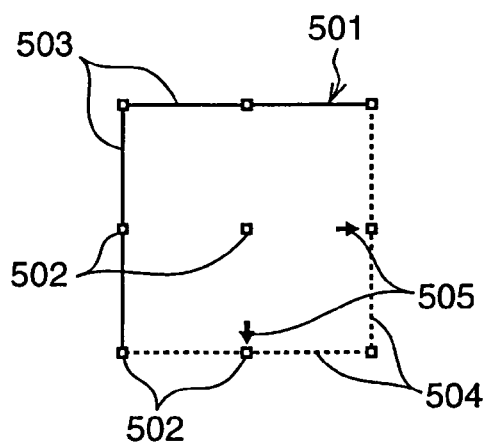
FIGS. 5A to 5D are views for explaining container display rules according to the first embodiment of the present invention.

In FIG. 5A, both the width and height of a container 501 are not fixed (are flexible). A fixed edge 503 is represented in a solid line, and a flexible edge 504 is represented in a dotted line. A scaling icon 505 exhibits that the adjacent edge 504 is flexible. An indicator in another form may be used instead or additionally.

Figure 5B:
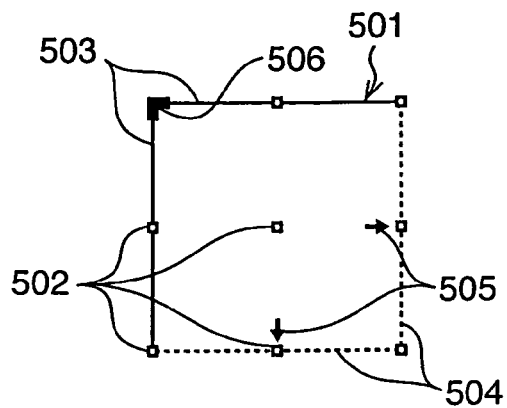

In FIG. 5B, both the width and height of the container 501 are flexible. An anchor icon 506 is so added as to explicitly represent that the corner position between two crossing edges 503 is fixed.

Figure 5C:
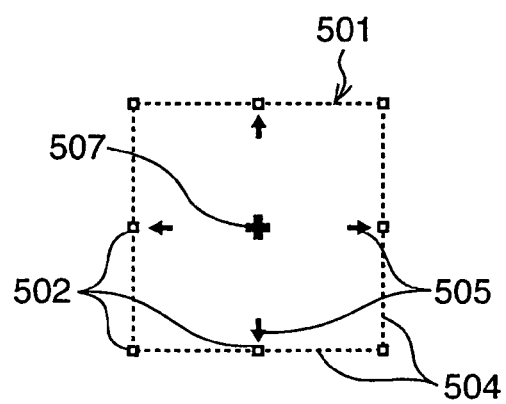

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

Figure 5D:
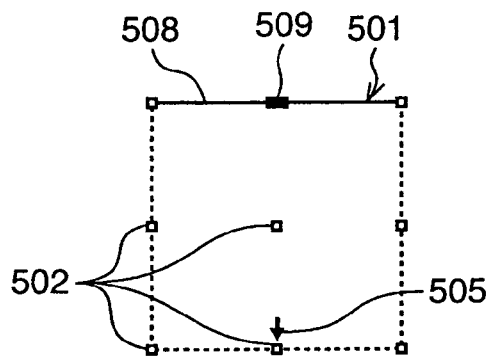

In FIG. 5D, an upper edge 508 of the container 501 is fixed, but both the width and height are flexible. The anchor icon 509 positioned at the center of the upper edge 508 is fixed. The left and right edges (502) of the container 501 move apart from or close to the vertical center axis (vertical axis) which extends through the anchor icon 509.

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
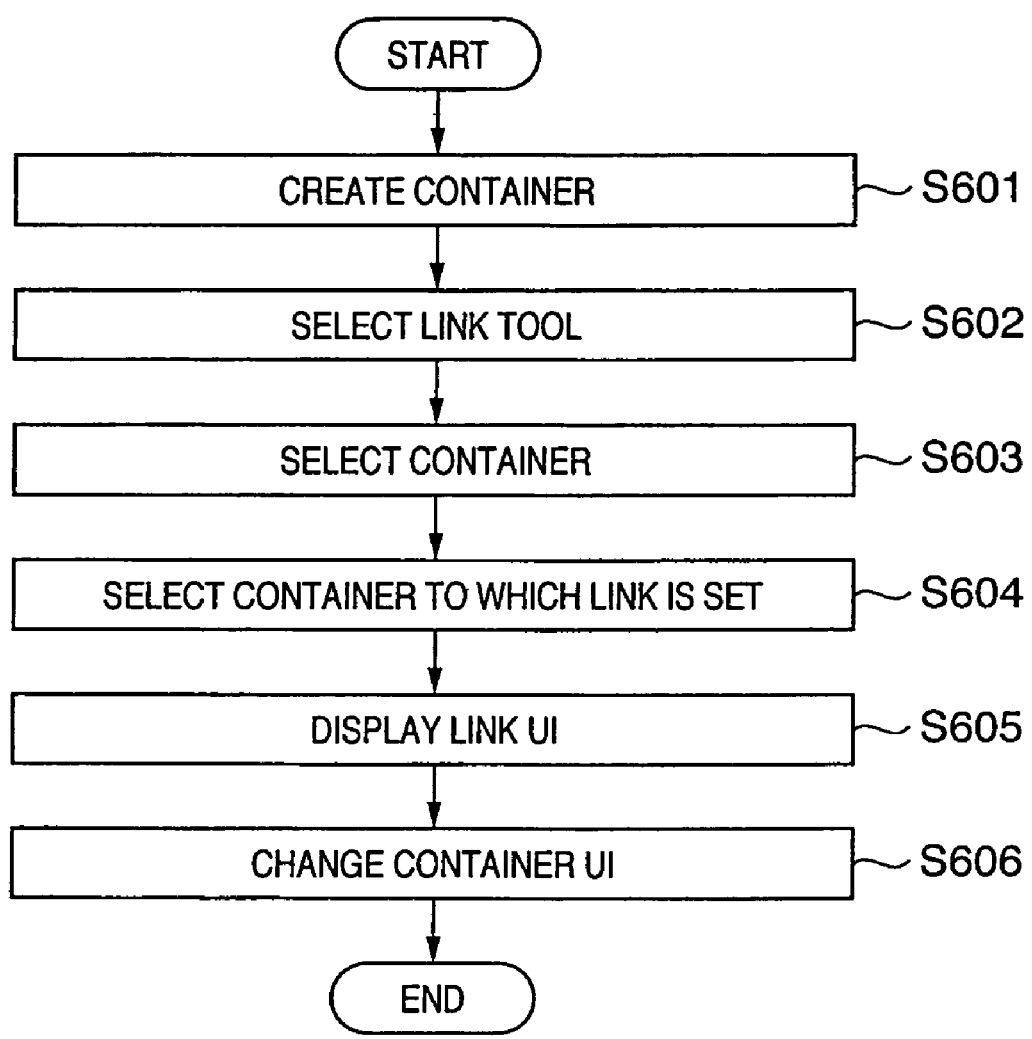
FIG. 6 is a flowchart showing a link setting process according to the first embodiment of the present invention.
Figure 7A:
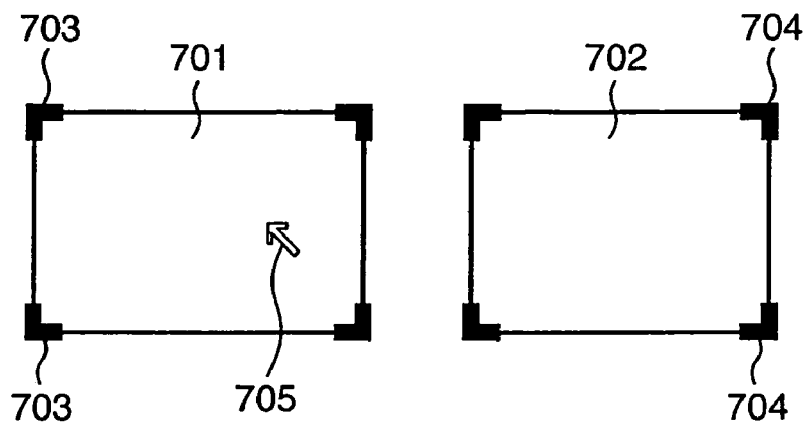
FIGS. 7A to 7C are views showing an example of transition of the user interface in setting a link according to the first embodiment of the present invention.
Figure 7B:
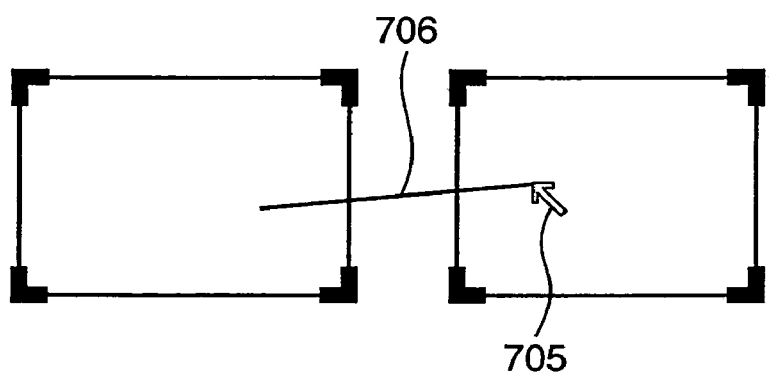
Figure 7C:
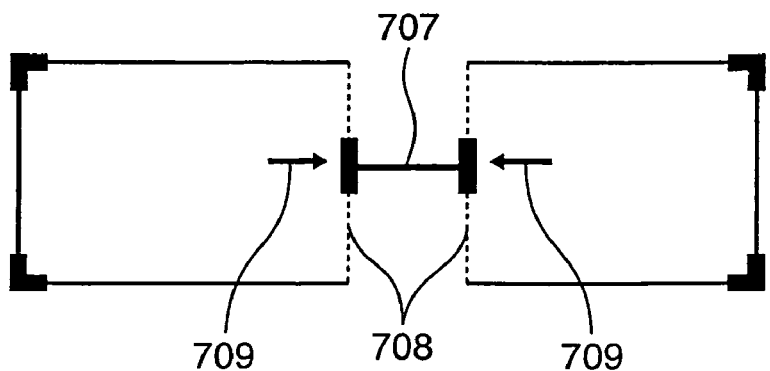

FIG. 6 is a flowchart showing a link setting process according to the first embodiment of the present invention. FIGS. 7A to 7C are views showing an example of transition of a user interface in setting a link according to the first embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7B exhibits a line which connects a click position in the state of FIG. 7A and the current position of the mouse pointer 705. A UI indicated by the line segment 706 can present the user with a position where a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>

[Layout Calculation Method (Overall Flow)]

The layout editing application 121 according to the first embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
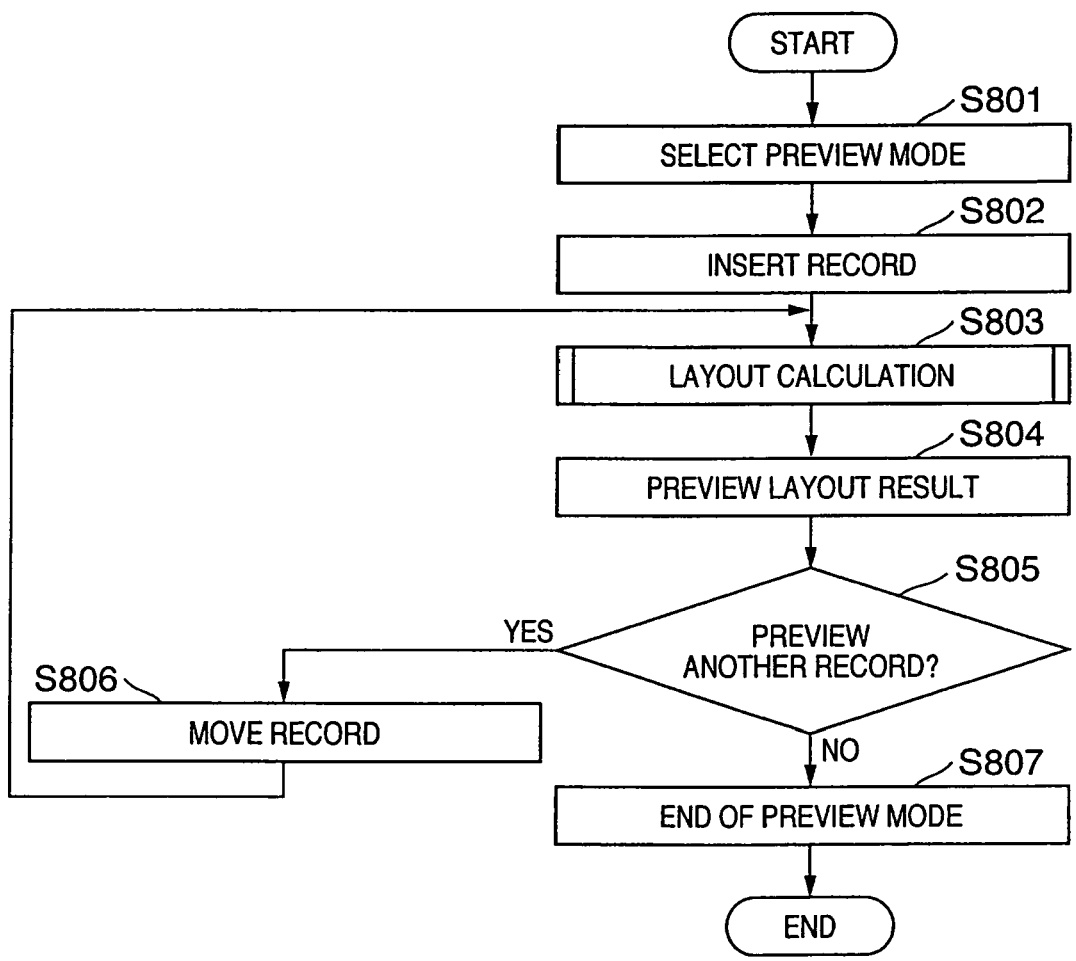
FIG. 8 is a flowchart showing a layout calculation process according to the first embodiment of the present invention.

FIG. 8 is a flowchart showing the layout calculation process in the layout editing application 121 according to the first embodiment of the present invention.

This control flow explains a method of flowing (merging) the contents of each record from the database 119 into a document template, and dynamically calculating the layout in accordance with the container attributes and the amount and size of each content. This flowchart describes control executed by the layout engine 105 of the layout editing application 121 using the processor 135 and memory 136.

When the preview mode is selected, the layout editing application 121 starts the process (step S801).

The above-described control in FIG. 6 is an operation in a layout mode in which an automatic layout system creates at least two containers and associates them to each other to create the layout of a document template.

To the contrary, the control in FIG. 8 starts by executing the preview mode in which a record is inserted into the layout created in FIG. 6 and a layout result after actually inserting the record is previewed. In step S801, the preview mode is selected, and an actual record is inserted to calculate the layout. In the preview mode, a layout for display is calculated. Also in actual printing, a record is inserted to calculate the layout. A calculation method in printing is also the same as that in the preview mode.

After the preview mode is set, the layout editing application 121 selects a record to be previewed, and inserts each field data of the selected record into each container (step S802). When the user designates a specific record, the designated record is previewed. If the user does not designate any record, calculation starts sequentially from the first record.

After each field data is inserted into a corresponding container, the layout editing application 121 performs layout calculation for laying out the record (step S803). Details of layout calculation in step S803 will be described with reference to FIG. 9.

The layout editing application 121 displays (previews) the layout calculated in the process of step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In the printing mode, unlike the preview mode, layout calculation is performed by the same procedure as the above-described one sequentially for all records to be printed. Hence, step S804 is omitted, and whether all records to be printed have been processed is determined in step S805. In step S807, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
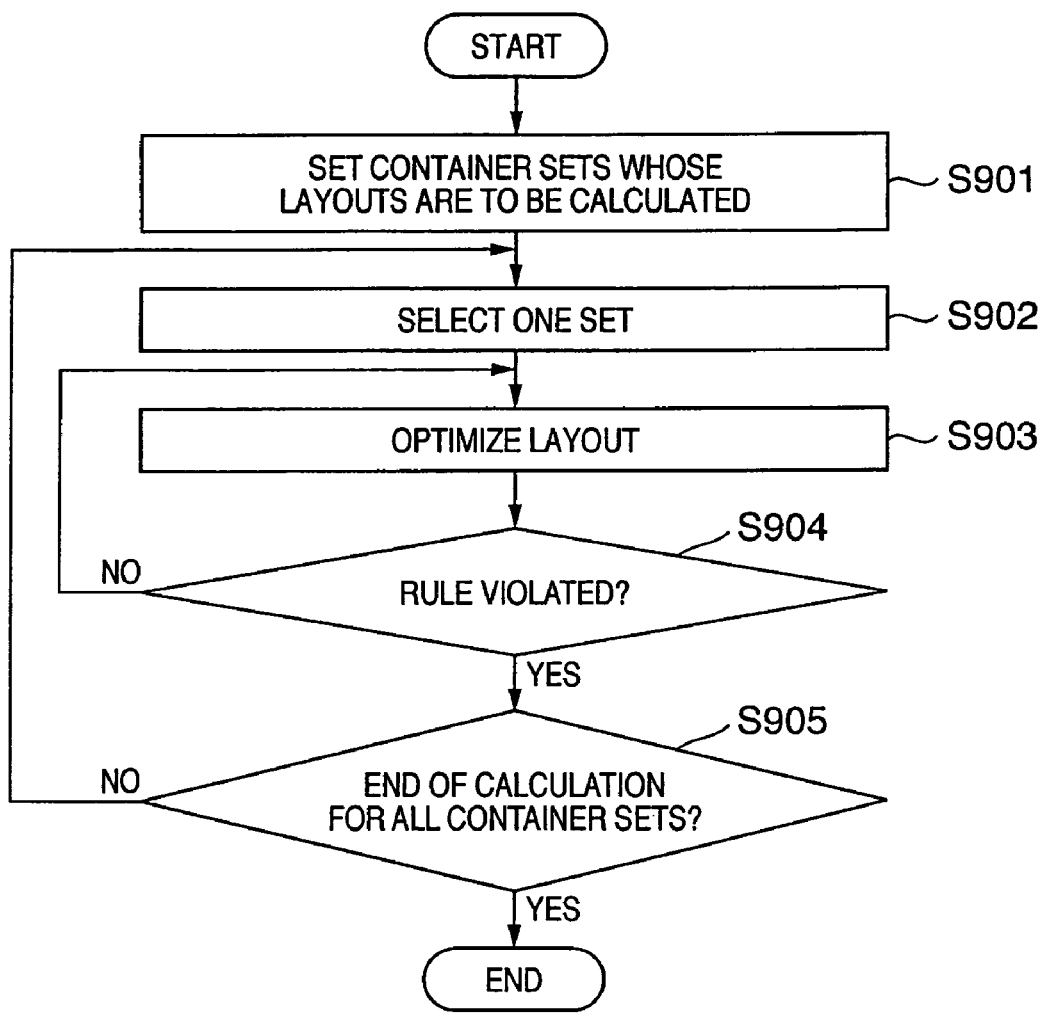
FIG. 9 is a flowchart showing details of the layout calculation process according to the first embodiment of the present invention.

FIG. 9 is a flowchart showing details of the layout calculation process according to the first embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets container sets whose layouts are to be calculated (step S901). Layout calculation is done for associated containers as one set.

Figure 10:
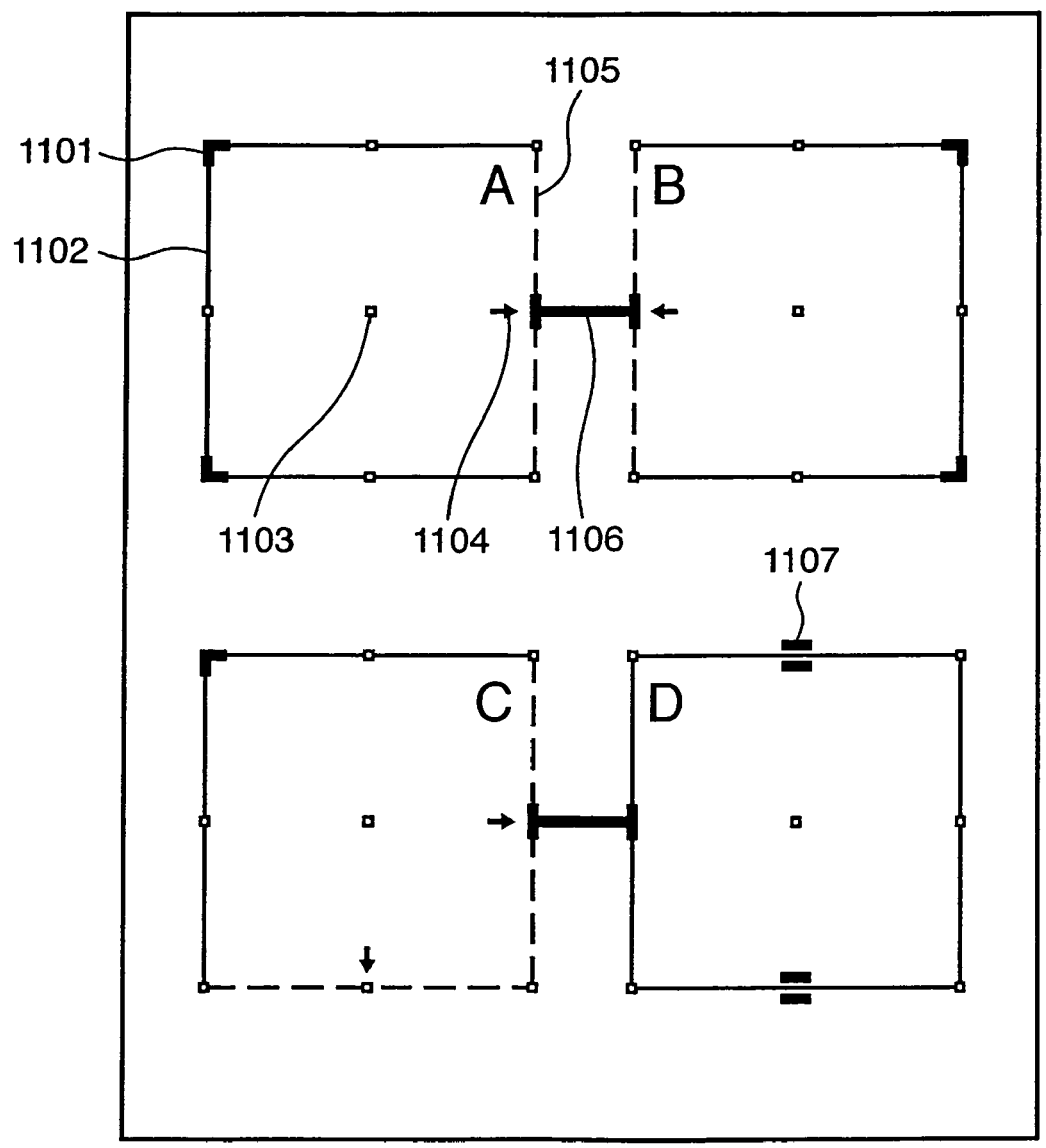
FIG. 10 is a view for explaining a set of containers in the layout calculation process according to the first embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and the link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout violates the rules (step S904). If the layout does not violate rules (YES in step S904), the process advances to step S905. If the layout violates the rules (NO in step S904), the process returns to step S903 to calculate the layout again so as not to violate the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to violate the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 1C.

Figure 11A:
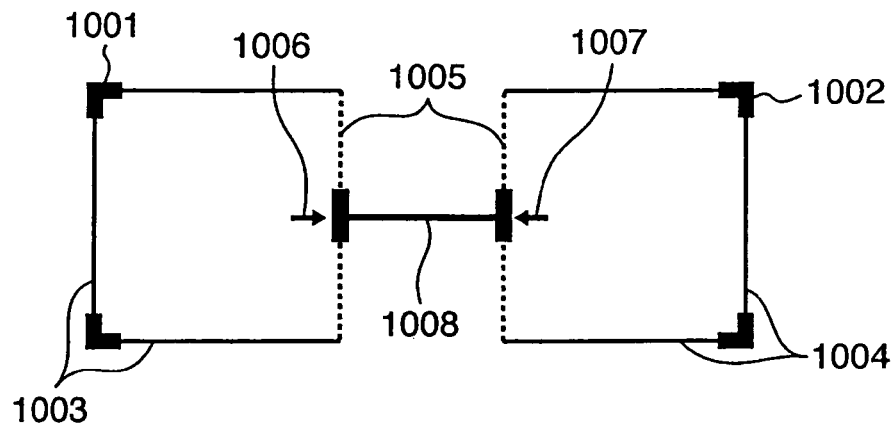
FIGS. 11A to 11C are views showing an example of the user interface in the layout calculation process according to the first embodiment of the present invention.
Figure 11B:
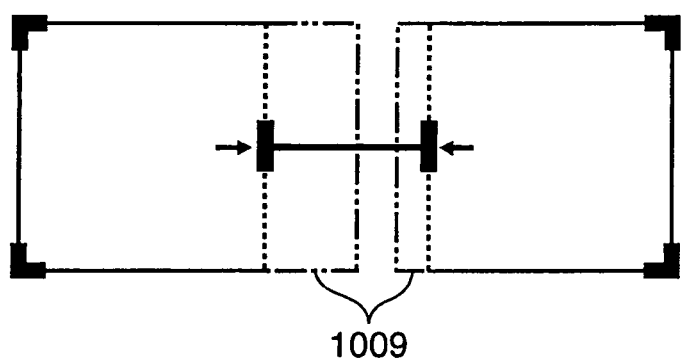
Figure 11C:
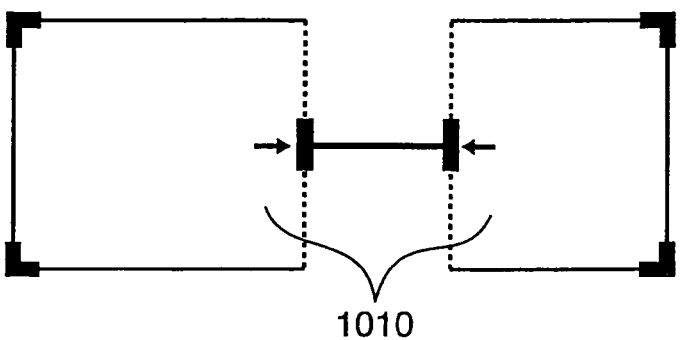

FIGS. 11A to 11C are views showing an example of a user interface in the layout calculation process according to the first embodiment of the present invention.

FIG. 11A shows a state in which a given record is inserted and the layout is decided. Reference numerals 1001 and 1002 denote anchors; 1003 and 1004, fixed edges; 1005, a flexible edge; 1006, an arrow indicating a direction in which a flexible edge changes; and 1108, a link. In this state, a record is changed, and contents of different sizes are inserted.

FIG. 11B shows the size of new contents over the state of FIG. 11A. Reference numeral 1009 denotes the size of contents which are inserted into each container. After that, the layout is calculated.

FIG. 11C shows the result of layout calculation. The size of each container after calculation is so calculated as to have a difference equal to that of the size of contents to be actually inserted, and not to violate the above-mentioned rules. As shown in FIG. 11C, the inserted-content size 1009 shown in FIG. 11B and a calculated content size 1010 have the same difference.

[Multiple Records]

An outline of multiple records will be explained.

Figure 12:
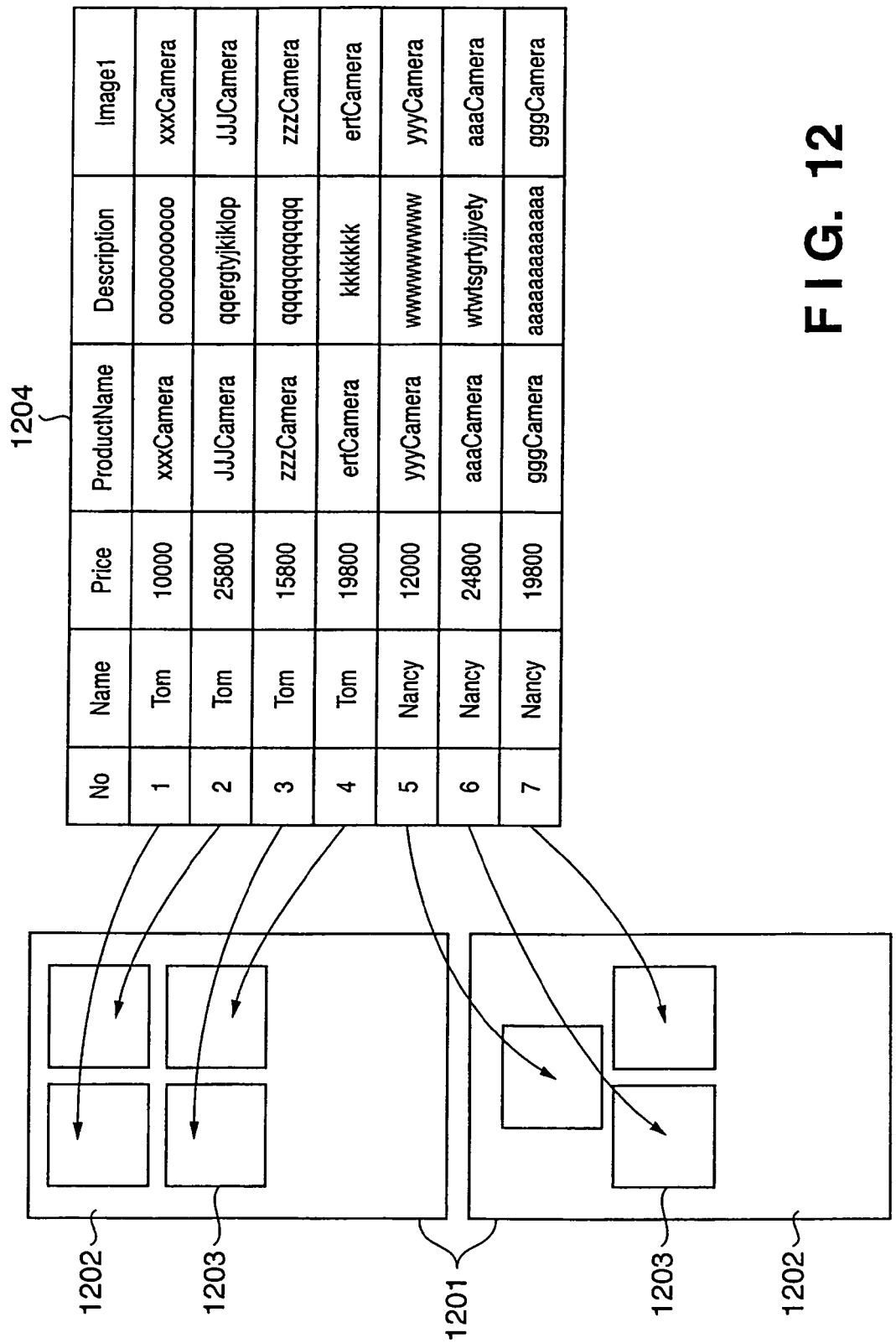
FIG. 12 is a view showing an outline of multiple records and a layout method for them according to the first embodiment of the present invention.

FIG. 12 is a view showing an outline of multiple records and a layout method for them according to the first embodiment of the present invention.

Reference numeral 1201 denotes a document; 1202, a page; 1203, a sub-template; and 1204, a database. The database 1204 manages records Nos. 1 to 7. In variable printing in which one record corresponds to one document, seven documents are created because there are seven records.

In variable printing which supports multiple records for one document, the following process is executed.

The user arbitrarily designates a column whose multiple records are designated. In this example, a field name "Name" is designated. In this case, records having the same field name are laid out in one document. In this example, the "Name"s of records Nos. 1 to 4 are "Tom", and these record data are laid out in the same document. Also, the "Name"s of records Nos. 5 to 7 are "Nancy", and these record data are laid out in the same document.

A characteristic process of the first embodiment will be explained.

Especially, the first embodiment executes a margin deletion process of deleting a margin present in a content on the basis of settings when the content is flowed into a container.

Note that a margin is a part except a main object (subject or region of interest) which forms a content, and is generally the background of the object. Also, in a content, the margin is a part having the same or similar color as or to that of a document in which the content is laid out.

A process which includes the margin deletion process and is executed by the variable printing system according to the first embodiment will be explained with reference to FIGS. 13 and 14.

Figure 13:
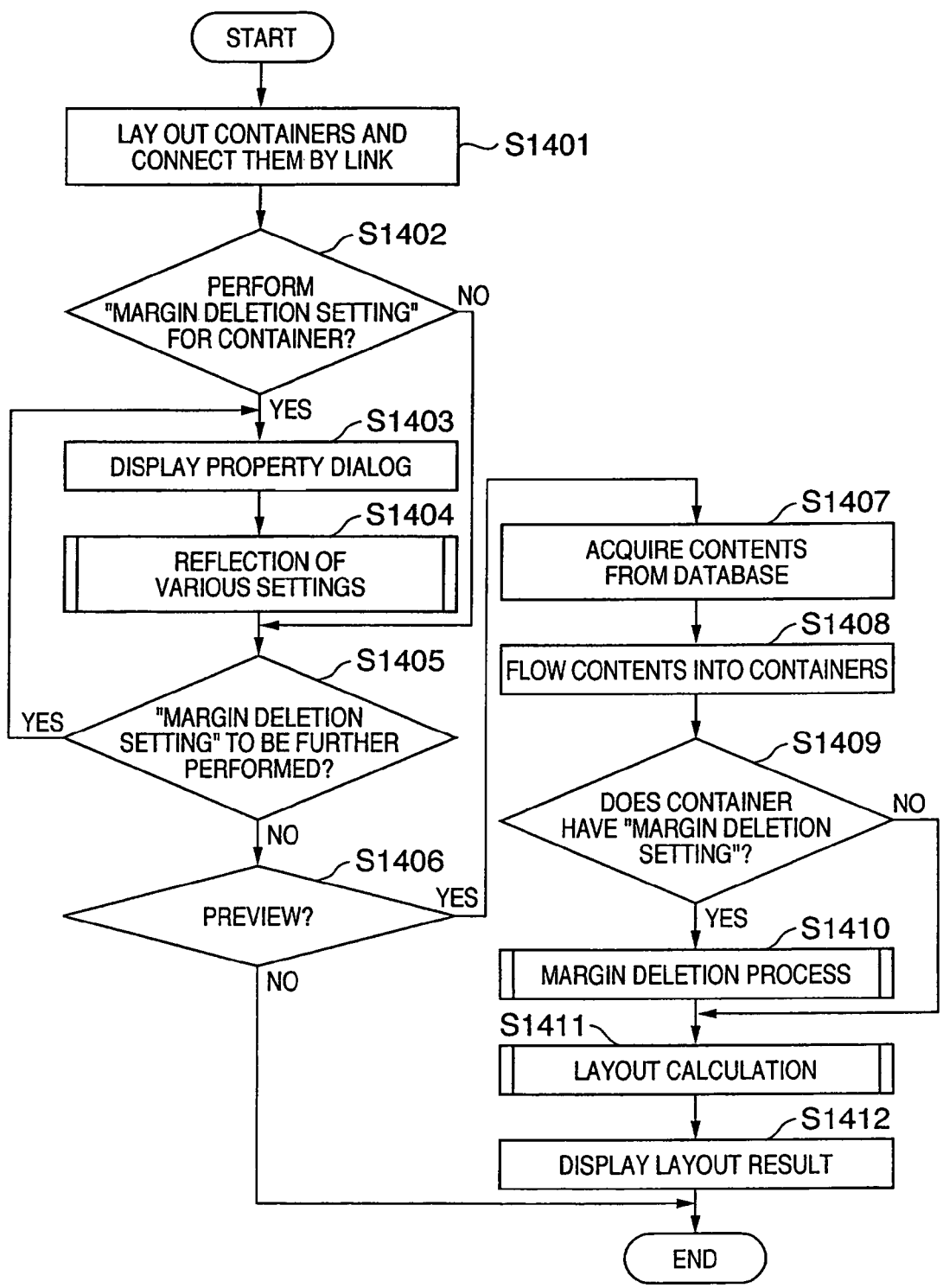
FIG. 13 is a flowchart showing a process executed by a variable printing system according to the first embodiment of the present invention.

FIG. 13 is a flowchart showing the process executed by the variable printing system according to the first embodiment of the present invention. FIG. 14 is a view for explaining a concrete example of the process executed by the variable printing system according to the first embodiment of the present invention.

The operator lays out containers on a page, and connects them by a link (step S1401). In (1) of FIG. 14, containers 1301 and 1302 are laid out on a page 1300, and connected by a link 1310.

The layout editing application 121 determines whether to perform "margin deletion setting" operation for the containers (step S1402). If no "margin deletion setting" operation is performed (NO in step S1402), the flow advances to step S1405; if "margin deletion setting" operation is performed (YES in step S1402), to step S1403. In (1) of FIG. 14, "margin deletion setting" operation is performed for the containers 1301 and 1302.

Note that the operator can select a container subjected to "margin deletion setting" by, e.g., operation of the mouse 133 and execute "margin deletion setting". As the selection & setting method, "margin deletion setting properties" are selected and set on a context menu which appears in response to, e.g., right clicking of the mouse 133.

If the layout editing application 121 determines in step S1402 to perform "margin deletion setting" operation, it displays a margin deletion setting property dialog (step S1403).

An example of the margin deletion setting property dialog will be explained with reference to FIG. 15.

Figure 15:
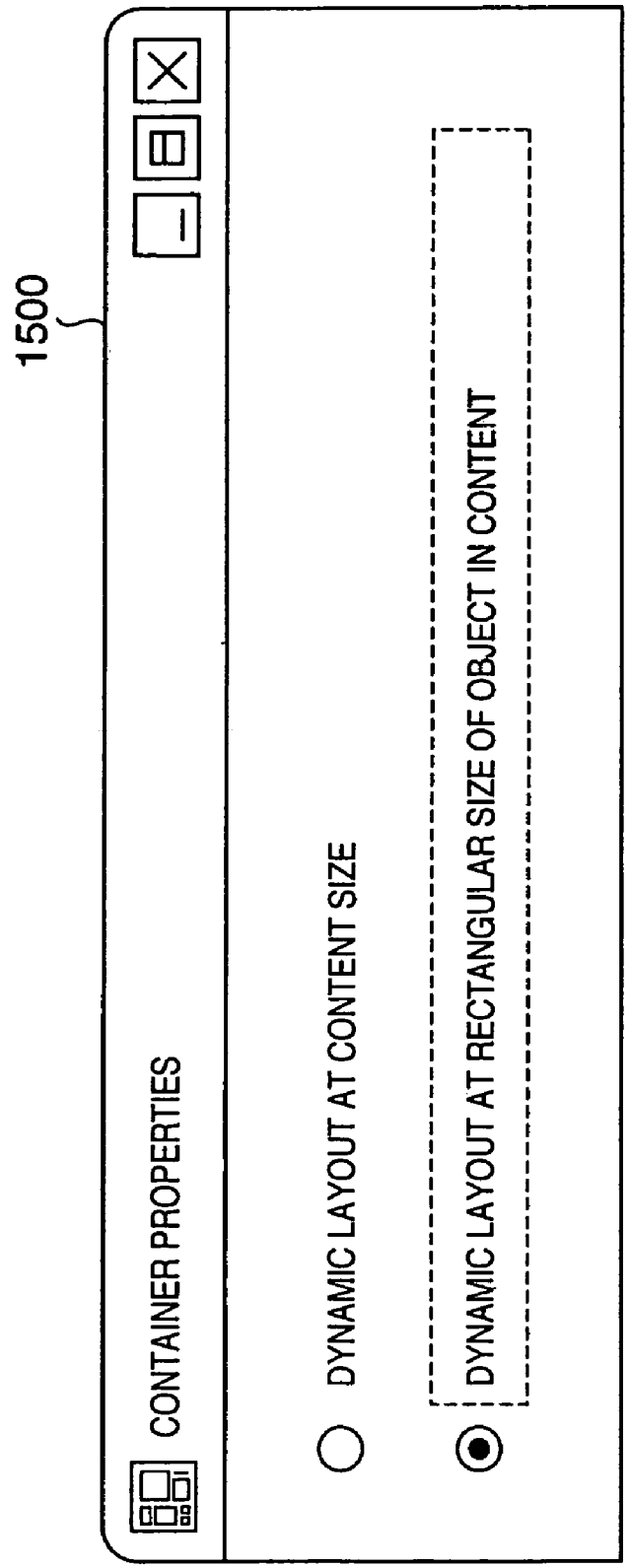
FIG. 15 is a view showing an example of a margin deletion setting property dialog according to the first embodiment of the present invention.

FIG. 15 is a view showing an example of the margin deletion setting property dialog according to the first embodiment of the present invention.

As shown in FIG. 15, a margin deletion setting property dialog 1500 provides radio buttons for selecting either "dynamic layout at a content size" or "dynamic layout at the rectangular size of an object in a content" as the process criterion of the margin deletion process.

For example, the operator selects the radio button "dynamic layout at the rectangular size of an object in a content" in the margin deletion setting property dialog 1500. After the margin deletion setting property dialog 1500 is closed, various settings are reflected in a page on the basis of the selected content (in this case, the margin deletion attribute is set ON and saved for a container to be processed) (step S1404).

The process up to this step is the margin deletion setting process for a container. Since the operator may want to make margin deletion setting for another container, the layout editing application 121 determines whether to perform "margin deletion setting" operation for another container (step S1405). If "margin deletion setting" operation is performed (YES in step S1405), the process returns to step S1403 to execute the same process. If no "margin deletion setting" operation is performed (NO in step S1405), the flow advances to step S1406.

The layout editing application 121 determines whether to preview the document (step S1406). If no document is previewed (NO in step S1406), the process ends; if the document is previewed (YES in step S1406), the flow advances to step S1407.

The process from step S1407 is a preview process.

The layout editing application 121 acquires contents from the database (step S1407). In (2) of FIG. 14, contents 1303 and 1304 are acquired.

The layout editing application 121 executes a process of flowing the acquired contents into respective containers (step S1408). In (2) of FIG. 14, the content 1303 is flowed into the container 1301, whereas the content 1304 is flowed into the container 1302.

The layout editing application 121 determines whether the container to be processed has "margin deletion setting" (step S1409). If no container has "margin deletion setting" (NO in step S1409), the flow advances to step S1411; if the container has "margin deletion setting" (YES in step S1409), to step S1410.

If the container has "margin deletion setting", the layout editing application 121 executes the margin deletion process (step S1410). The margin deletion process may be performed before or after contents are flowed. In (3) of FIG. 14, both the containers 1301 and 1302 have "margin deletion setting", and the margins of the contents 1303 and 1304 to be flowed into them are deleted.

The layout editing application 121 executes layout calculation to finalize the positions and sizes of the containers (step S1411). For example, in (4) and (5) of FIG. 14, while the aspect ratios of the contents 1303 and 1304 are kept constant, the contents 1303 and 1304 are enlarged/reduced and fitted along the fixed long edges of the containers 1301 and 1302 in which the contents 1303 and 1304 exist. Further, the flexible long edges of the containers 1301 and 1302 are fitted to the contents 1303 and 1304, and the associated containers are moved.

Figure 14:
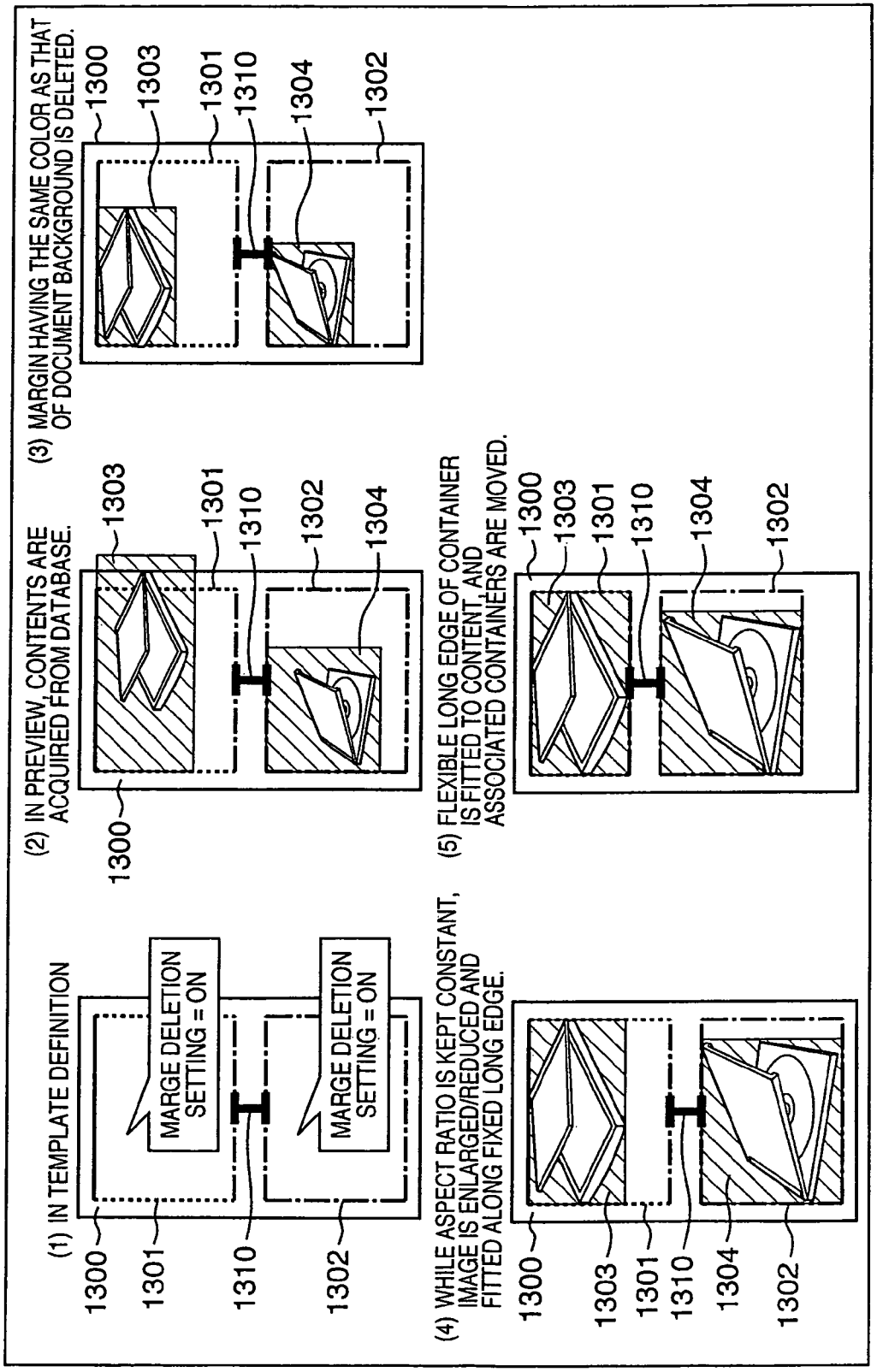
FIG. 14 is a view for explaining a concrete example of the process executed by the variable printing system according to the first embodiment of the present invention.

After that, the layout editing application 121 displays (previews) the layout result (step S1412, (5) of FIG. 14).

Details of the margin deletion process in step S1410 will be explained with reference to FIGS. 16A to 16F.

FIGS. 16A to 16F are views for explaining details of the margin deletion process according to the first embodiment of the present invention.

Figure 16A:
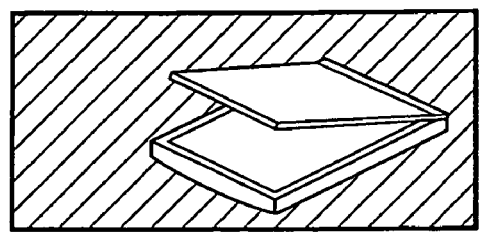
FIGS. 16A to 16F are views for explaining details of a margin deletion process according to the first embodiment of the present invention.

In FIG. 16A, the layout editing application 121 binarizes a content (e.g., image) to be processed.

Figure 16B:
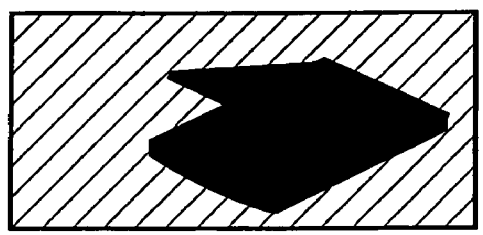

In FIG. 16B, from an arbitrary edge of a content having a background (margin) of a rectangular region, the layout editing application 121 scans the image perpendicularly to the edge to detect an object pixel (effective pixel (In this case, for example, a black pixel among monochrome pixels)) which forms a main object in the content.

This detection is executed on the basis of the background color of the document in which the content is laid out. The background color of the document is generally white. Thus, in FIG. 16B, a region (margin) having the same color as the background color is detected, as described above. When the background color is a color other than white, an object pixel which forms a main object in the content is detected on the basis of this color.

In addition to detecting a region having the same color as the background color, a region having colors in a predetermined color range including the background color may also be detected as a margin.

Figure 16C:
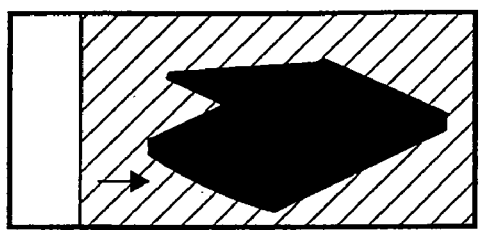

In FIG. 16C, after the layout editing application 121 detects an object pixel during scanning, it stores a region up to the coordinates of the detected object pixel as a margin region in the memory 136.

Figure 16D:
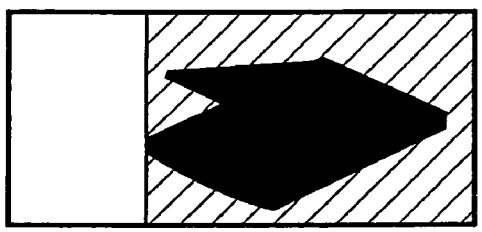

In FIG. 16D, the layout editing application 121 executes the same process as that in FIG. 16C for three remaining edges.

Figure 16E:
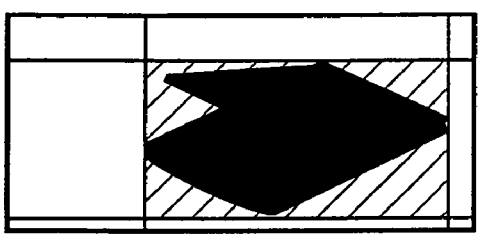
Figure 16F:
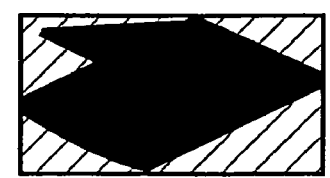

In FIG. 16E, the layout editing application 121 deletes, from the content, the region which is stored as the margin region in the memory 136 in FIGS. 16C and 16D. The layout editing application 121 flows the remaining region (the circumscribed rectangular region (region of interest) of a main object in the content) as a content image into a container.

In other words, in the process described with reference to FIGS. 16A to 16F, a line segment parallel to an edge at which scanning starts. The line segment is obtained by scanning a content (data) perpendicularly to a direction from each edge of the content of a rectangular region to an opposite edge. The line segment contains a pixel at which a color other than colors in a predetermined color range including the background color of a document page is detected first. A rectangular region surrounded by line segments detected by scanning edges is detected as a region of interest. A region except the region of interest is defined as a margin region.

As described above, the first embodiment implements the "margin deletion setting" function for a container on a page. The size of a content flowed into the container having the "margin deletion setting" is adjusted by removing, from around the content, a part having the same or similar color (e.g., a color whose density value or luminance value falls within a predetermined color range of the density value or luminance value of the background color) as or to the background color of a document. The rectangular content left after removal of that part is flowed into the container.

A main object in the content can, therefore, be laid out in a container at a size at which the main object can be visually recognized properly and easily. The operator need not perform any troublesome work of deleting an unnecessary margin from a content, and user friendliness further improves. Since contents to be flowed into container regions in a document can be effectively used, the information density of the entire document can be increased.

Second Embodiment

The second embodiment is an application of the first embodiment. The first embodiment has described a configuration in which a main part in a content can be more preferably laid out in a container by deleting a margin from the content.

To the contrary, the second embodiment will explain a configuration in which when containers are positioned (laid out) on the two sides of the link for connecting them, a margin on the link side of a content in each container is ignored to minimize the distance between contents, and the containers and contents are more preferably laid out.

A process executed by a variable printing system according to the second embodiment will be explained with reference to FIGS. 17 to 19.

Figure 17:
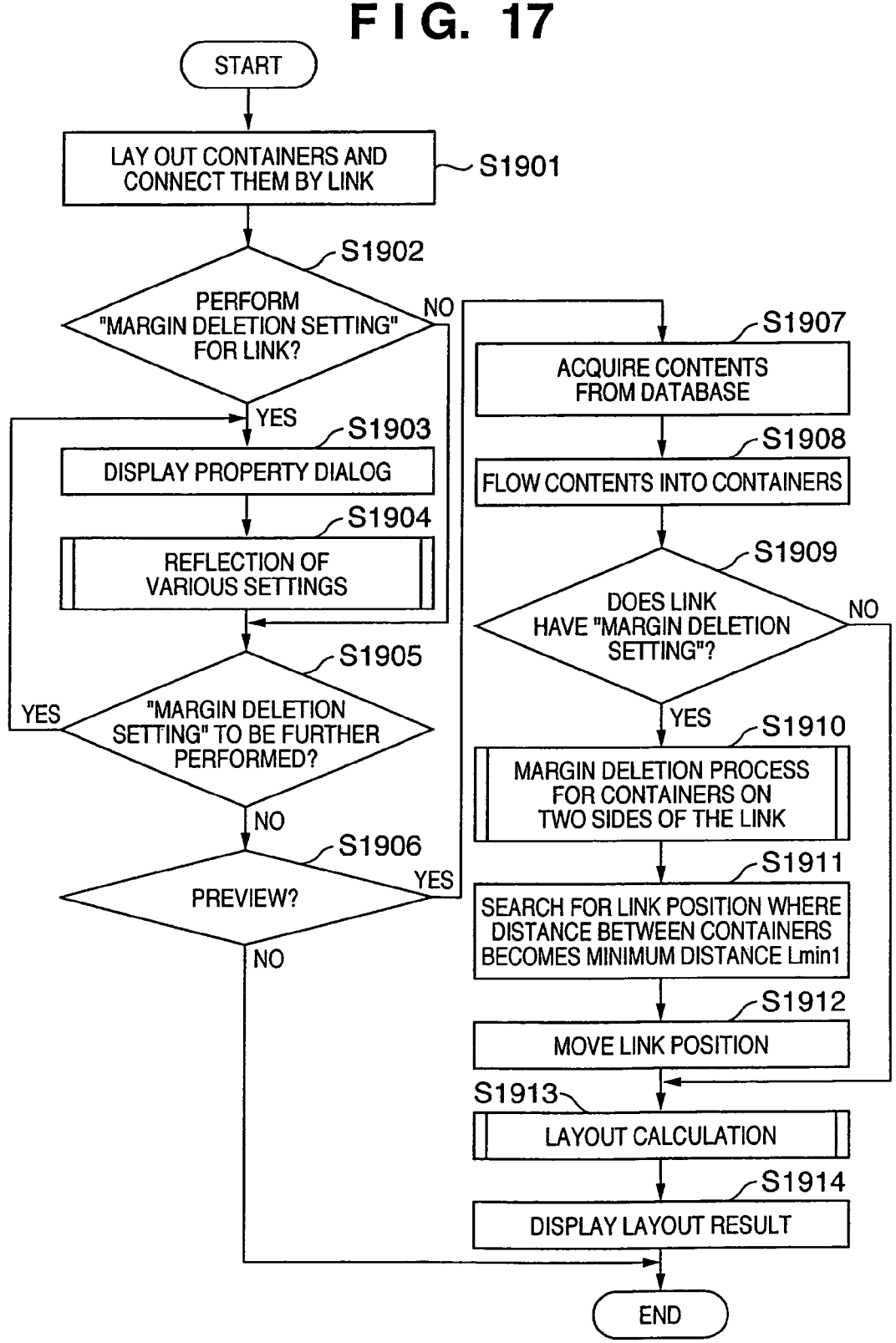
FIG. 17 is a flowchart showing a process executed by a variable printing system according to the second embodiment of the present invention.

FIG. 17 is a flowchart showing the process executed by the variable printing system according to the second embodiment of the present invention. FIGS. 18 and 19 are views for explaining concrete examples of the process executed by the variable printing system according to the second embodiment of the present invention.

Figure 18:
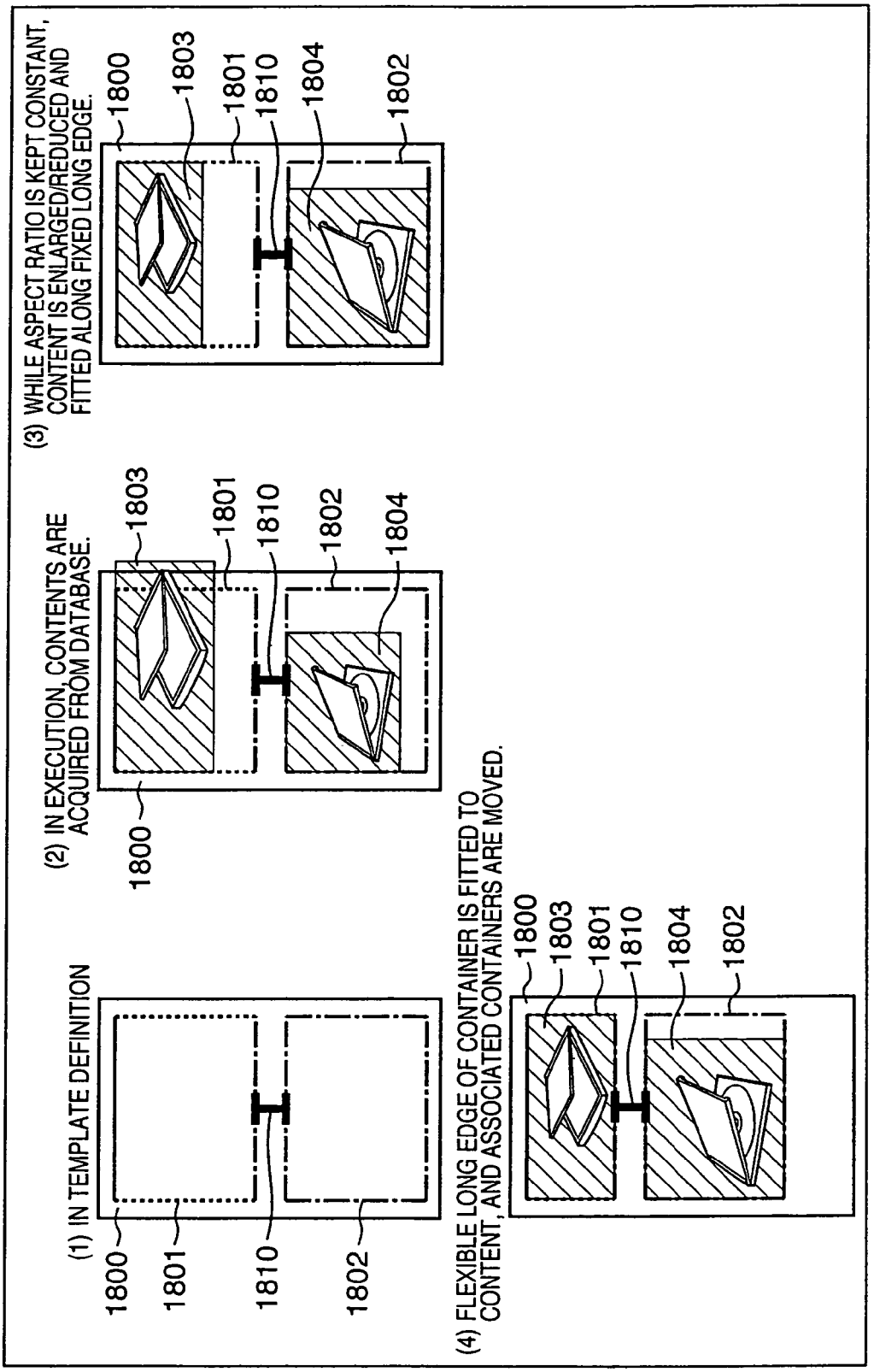
FIG. 18 is a view for explaining a concrete example of the process executed by the variable printing system according to the second embodiment of the present invention.
Figure 19:
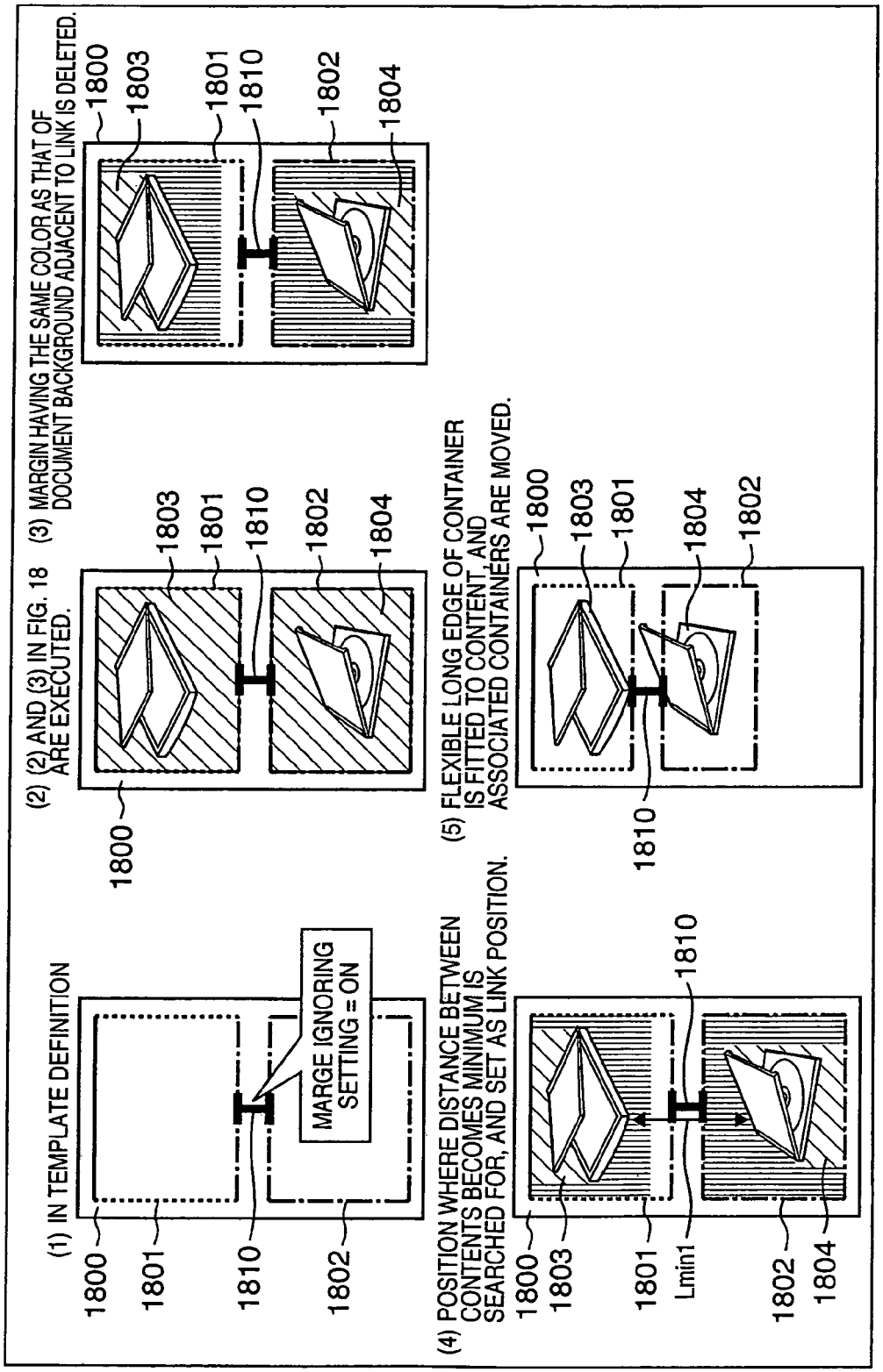
FIG. 19 is a view for explaining another concrete example of the process executed by the variable printing system according to the second embodiment of the present invention.

FIG. 18 illustrates a concrete example when "margin ignoring setting" (to be described later) is OFF, and FIG. 19 illustrates a concrete example when "margin ignoring setting" is ON.

The operator lays out containers on a page, and connects them by a link (step S1901). In (1) of FIG. 18, containers 1801 and 1802 are laid out on a page 1800, and connected by a link 1810.

A layout editing application 121 determines whether to perform "margin ignoring setting" operation for the link (step S1902). If no "margin ignoring setting" operation is performed (NO in step S1902), the flow advances to step S1905; if "margin ignoring setting" operation is performed (YES in step S1902), to step S1903. In (1) of FIG. 19, "margin ignoring setting" operation is performed for the link 1810.

Note that the operator can select a link subjected to "margin ignoring setting" by, e.g., operation of a mouse 133 and execute "margin ignoring setting". As the selection & setting method, "margin ignoring setting properties" are selected and set on a context menu which appears in response to, e.g., right clicking of the mouse 133.

If the layout editing application 121 determines in step S1902 to perform "margin ignoring setting" operation, it displays a margin ignoring setting property dialog (step S1903).

An example of the margin ignoring setting property dialog will be explained with reference to FIG. 20.

FIG. 20 is a view showing an example of the margin ignoring setting property dialog according to the second embodiment of the present invention.

As shown in FIG. 20, a margin deletion setting property dialog 2000 provides radio buttons for selecting either "linking at a container size" or "linking to an object in a container" as the process criterion of the margin deletion process.

For example, the operator selects the radio button "linking to an object in a container" in the margin deletion setting property dialog 2000. After the margin deletion setting property dialog 2000 is closed, various settings are reflected in a page on the basis of the selected content (in this case, the margin ignoring attribute is set ON and saved for a link to be processed) (step S1904).

The process up to this step is the margin ignoring setting process for a link. Since the operator may want to make margin ignoring setting for another link, the layout editing application 121 determines whether to perform "margin ignoring setting" operation for another container (step S1905). If "margin ignoring setting" operation is performed (YES in step S1905), the process returns to step S1903 to execute the same process. If no "margin ignoring 2.0 setting" operation is performed (NO in step S1905), the flow advances to step S1906.

The layout editing application 121 determines whether to preview the document (step S1906). If no document is previewed (NO in step S1906), the process ends; if the document is previewed (YES in step S1906), the flow advances to step S1907.

The process from step S1907 is a preview process.

The layout editing application 121 acquires contents from the database (step S1907). In (2) of FIG. 18, contents 1803 and 1804 are acquired.

The layout editing application 121 executes a process of flowing the acquired contents into respective containers (step S1908). In (2) of FIG. 18, the content 1803 is flowed into the container 1801, whereas the content 1804 is flowed into the container 1802.

The layout editing application 121 determines whether the link to be processed has "margin ignoring setting" (step S1909). If no link has "margin ignoring setting" (NO in step S1909), the flow advances to step S1913; if the link has "margin ignoring setting" (YES in step S1909), to step S1910.

If no link has "margin ignoring setting" in step S1909, the layout editing application 121 executes layout calculation, and displays the layout result in step S1914. For example, in (3) and (4) of FIG. 18, while the aspect ratios of the contents 1803 and 1804 are kept constant, the contents 1803 and 1804 are enlarged/reduced and fitted along the fixed long edges of the containers 1801 and 1802 in which the contents 1803 and 1804 exist. Further, the flexible long edges of the containers 1801 and 1802 are fitted to the contents 1803 and 1804, and the associated containers are moved.

If the link has "margin ignoring setting" in step S1909, the layout editing application 121 executes a process (corresponding to (2) of FIG. 19) up to (2) and (3) of FIG. 18. After that, the layout editing application 121 executes a margin deletion process on the two sides of the link as the margin ignoring setting process (step S1910). In (3) of FIG. 19, margins on the sides of the link 1810 among the margins of the contents 1803 and 1804 are deleted.

Note that the margin ignoring setting process according to the second embodiment is to implement a layout which, when the positions of containers on the two sides of a link are decided, ignores the margins of contents in the containers to minimize the distances between the contents. When viewed from the contents, margins on the link side are deleted.

The layout editing application 121 searches for a position where the distance between contents becomes a minimum distance Lmin1, and sets the position as a link position (step S1911, (4) of FIG. 19).

The layout editing application 121 moves the link to the set link position (step S1912, (5) of FIG. 19).

The layout editing application 121 executes layout calculation to finalize the positions and sizes of the containers (step S1913). After that, the layout editing application 121 displays (previews) the layout result (step S1914, (5) of FIG. 19).

Details of the margin deletion process in step S1910 will be explained with reference to FIGS. 21A to 21D.

FIGS. 21A to 21D are views for explaining details of the margin deletion process according to the second embodiment of the present invention.

Figure 21A:
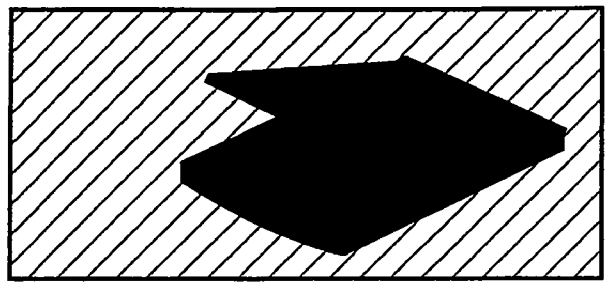
FIGS. 21A to 21D are views for explaining details of a margin deletion process according to the second embodiment of the present invention.

In FIG. 21A, the layout editing application 121 binarizes a content (e.g., image) to be processed.

Figure 21B:
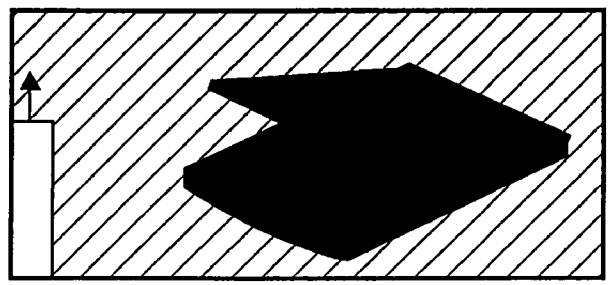

In FIG. 21B, the layout editing application 121 divides, into line segments of a predetermined unit, an edge of a container (in FIG. 19, e.g., the container 1801) connected to a link (in FIG. 19, the link 1810) whose margin ignoring attribute is set "ON". The layout editing application 121 scans the image for each line segment in a direction perpendicular to the edge.

Figure 21C:
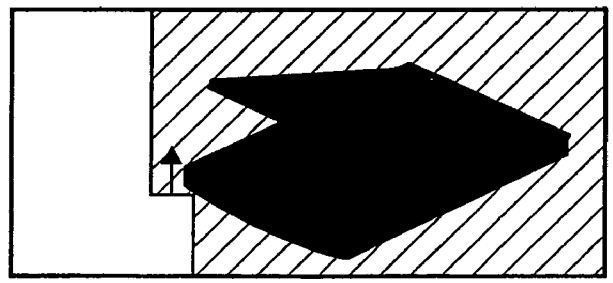

In FIG. 21C, the layout editing application 121 searches a line segment during scanning for an object pixel (effective pixel (in this case, a black pixel among monochrome pixels)) which forms a main object in the content. After the layout editing application 121 detects the object pixel, it stops scanning of the current line segment, stores its position in a memory 136, and shifts to scanning of the next line segment.

This detection is based on the same detection principle described with reference to FIG. 16B in the first embodiment.

Figure 21D:
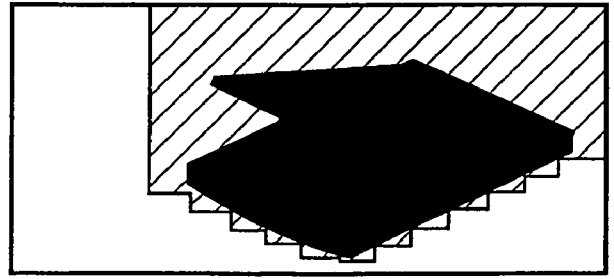

In FIG. 21D, the layout editing application 121 repeats the process in FIG. 21C, scans all the edges to be processed, and deletes margins in the content that are in contact with the edges to be processed. That is, regions between the position stored in the memory 136 and edges to be processed are deleted from a content. The remaining region is flowed as a content image into a container.

In the process described with reference to FIGS. 21A to 21D, an image is scanned for each predetermined line segment perpendicularly to a direction from an edge on the link side among edges of a content of a rectangular region to an opposite edge. A line segment region up to a pixel at which a color other than colors in a predetermined color range including the background color of a page is detected first is detected by scanning along each line segment. A region defined by the line segment regions detected by respective scanning operations is detected as a margin region, and a region except the margin region is detected as a region of interest.

As described above, according to the second embodiment, when containers are positioned (laid out) on the two sides of a link for connecting the containers, margins on the link sides of contents in the containers are ignored to minimize the distances between the contents. As a result, margins on the link sides of contents can be deleted, and the distance between the containers (contents) can be minimized by this deletion.

The second embodiment can attain the same effects as those of the first embodiment.

Third Embodiment

The third embodiment is an application of the second embodiment. The second embodiment has described a configuration in which a margin on the link side among margins of a content in a container is ignored (deleted) to more preferably lay out the container and content.

To the contrary, the third embodiment will explain a configuration in which the orientation of a content is mirror-reversed, and containers and contents are more preferably laid out on the basis of the distance between contents before and after mirror reverse.

A process executed by a variable printing system according to the third embodiment will be explained with reference to FIGS. 22 and 23.

Figure 22:
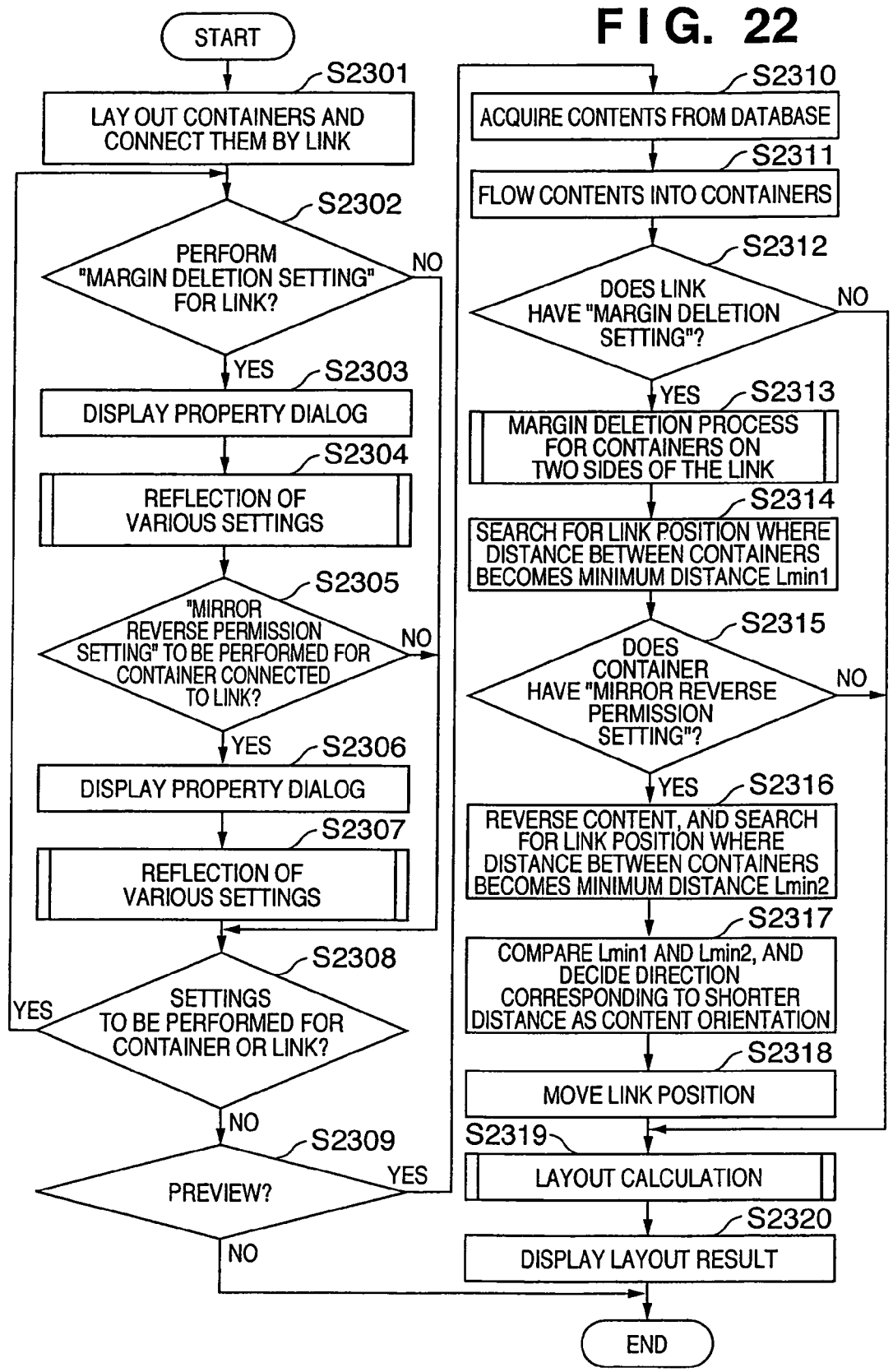
FIG. 22 is a flowchart showing a process executed by a variable printing system according to the third embodiment of the present invention.

FIG. 22 is a flowchart showing the process executed by the variable printing system according to the third embodiment of the present invention. FIG. 23 is a view for explaining a concrete example of the process executed by the variable printing system according to the third embodiment of the present invention.

The operator lays out containers on a page, and connects them by a link (step S2201). In (1) of FIG. 23, containers 2301 and 2302 are laid out on a page 2300, and connected by a link 2310.

A layout editing application 121 determines whether to perform "margin ignoring setting" operation for the link (step S2302). If no "margin ignoring setting" operation is performed (NO in step S2302), the flow advances to step S2308; if "margin ignoring setting" operation is performed (YES in step S2302), to step S2303. In (1) of FIG. 23, "margin ignoring setting" operation is performed for the link 2310.

Note that the selection & setting method for a link subjected to "margin ignoring setting" is the same as that in the second embodiment.

If the layout editing application 121 determines in step S2302 to perform "margin ignoring setting" operation, it displays a margin ignoring setting property dialog (step S2303). Various settings are reflected in a page on the basis of an operation of the margin ignoring setting property dialog by the operator (step S2304).

Then, the layout editing application 121 determines whether to perform "mirror reverse permission setting" operation for a container connected to the link (step S2305).

If no "mirror reverse permission setting" operation is performed (NO in step S2305), the flow advances to step S2308; if "mirror reverse permission setting" operation is performed (YES in step S2305), to step S2306. In (1) of FIG. 23, "mirror reverse permission setting" operation is performed for the container 2302.

Note that the operator can select a link subjected to "mirror reverse permission setting" by, e.g., operation of a mouse 133 and execute "mirror reverse permission setting". As the selection & setting method, "mirror reverse permission setting properties" are selected and set on a context menu which appears in response to, e.g., right clicking of the mouse 133.

If the layout editing application 121 determines in step S2305 to perform "mirror reverse permission setting" operation, it displays a mirror reverse permission setting property dialog (step S2306).

An example of the mirror reverse permission setting property dialog will be explained with reference to FIG. 24.

Figure 24:
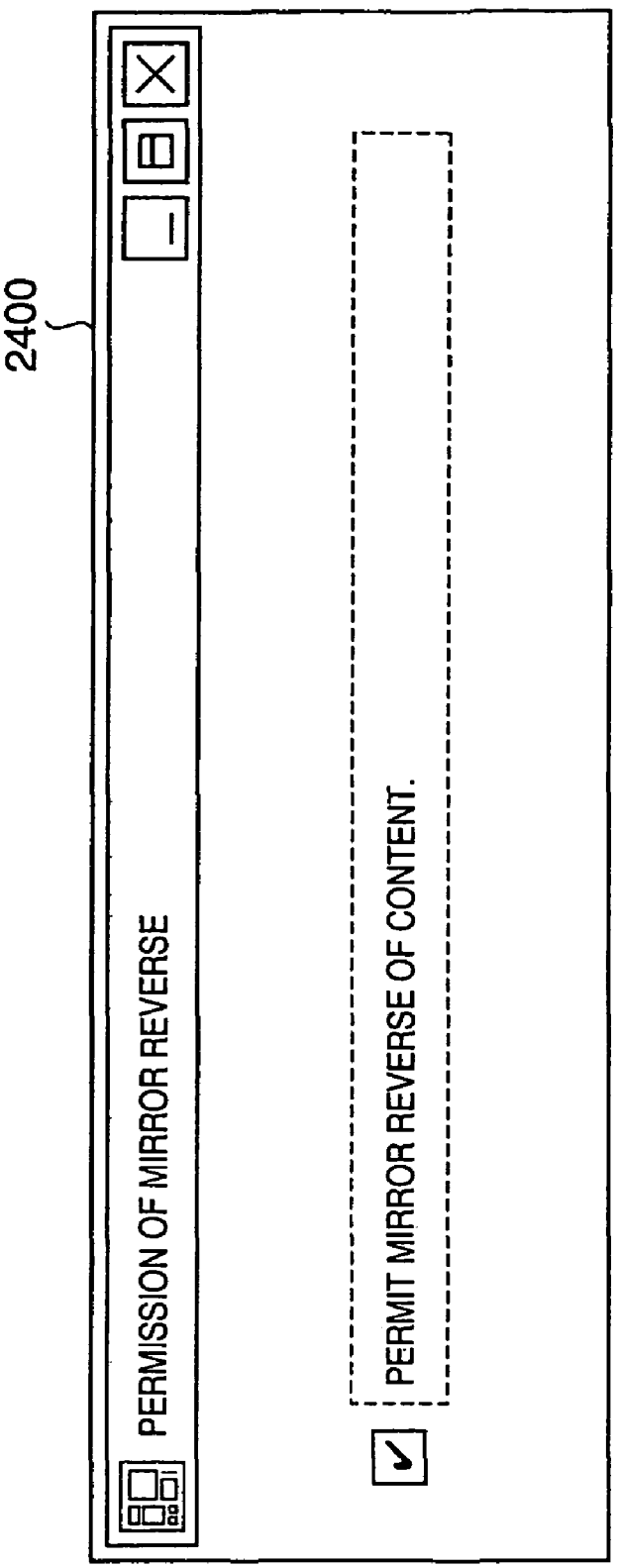
FIG. 24 is a view showing an example of a mirror reverse permission setting property dialog according to the third embodiment of the present invention.

FIG. 24 is a view showing an example of the mirror reverse permission setting property dialog according to the third embodiment of the present invention.

As shown in FIG. 24, a mirror reverse permission setting property dialog 2400 provides a check button for selecting "permit mirror reverse of a content." as mirror reverse permission setting.

For example, the operator selects the check box "permit mirror reverse of a content." in the mirror reverse permission setting property dialog 2400. After the mirror reverse permission setting property dialog 2400 is closed, various settings are reflected in a page on the basis of the selected content (in this case, the mirror reverse permission attribute is set ON and saved for a container to be processed) (step S2307).

The process up to this step is the margin ignoring setting process for a link and the mirror reverse permission setting process for a container. Since the operator may want to make margin ignoring setting for another link or "mirror reverse permission setting" for another container, the layout editing application 121 determines whether to perform various setting operations for another link or container (step S2308). If various setting operations are performed (YES in step S2308), the process returns to step S2302 to execute the same process. If various setting operations are not performed (NO in step S2308), the flow advances to step S2309.

The layout editing application 121 determines whether to preview the document (step S2309). If no document is previewed (NO in step S2.309), the process ends; if the document is previewed (YES in step S2309), the flow advances to step S2310.

The process from step S2309 is a preview process.

The layout editing application 121 acquires contents from the database (step S2310). In (2) of FIG. 23, contents 2303 and 2304 are acquired (corresponding to (2) of FIG. 19).

The layout editing application 121 executes a process of flowing the acquired contents into respective containers (step S2311). In (2) of FIG. 23, the content 2303 is flowed into the container 2301, whereas the content 2304 is flowed into the container 2302 (corresponding to (2) of FIG. 19).

The layout editing application 121 determines whether the link to be processed has "margin ignoring setting" (step S2312). If no link has "margin ignoring setting" (NO in step S2312), the flow advances to step S2319; if the link has "margin ignoring setting" (YES in step S2312), to step S2313.

Figure 23:
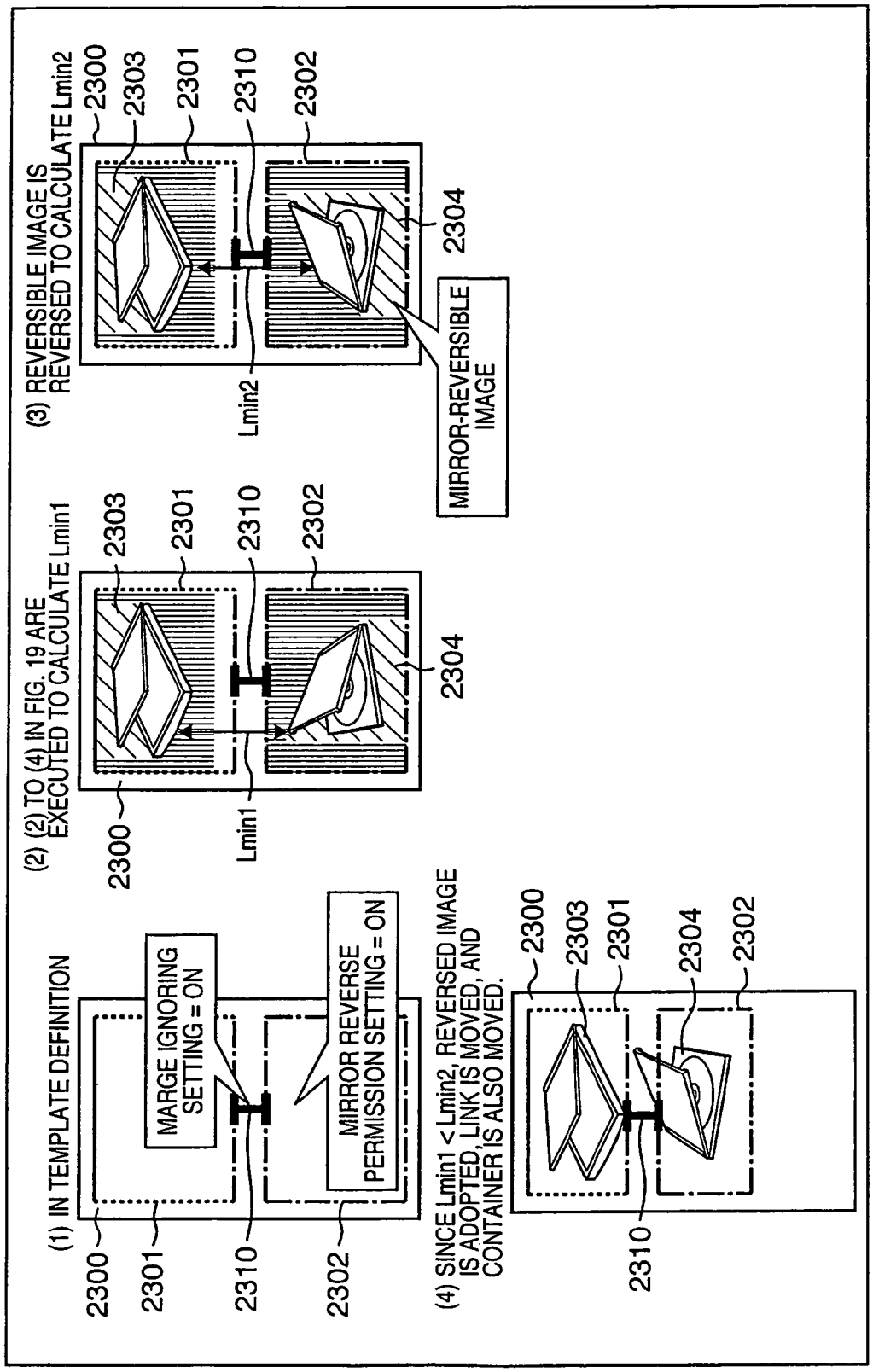
FIG. 23 is a view for explaining a concrete example of the process executed by the variable printing system according to the third embodiment of the present invention.

If the link has "margin ignoring setting" in step S2312, the layout editing application 121 executes a margin deletion process on the two sides of the link as the margin ignoring setting process (step S2313, (2) of FIG. 23 ((3) of FIG. 19)).

The layout editing application 121 searches for a position where the distance between contents becomes a minimum distance Lmin1 (step S2314, (2) of FIG. 23 ((4) of FIG. 19)).

The layout editing application determines whether the container to be processed has "mirror reverse permission setting" (step S2315). If no container has "mirror reverse permission setting" (NO in step S2315), the flow advances to step S2319; if the container has "mirror reverse permission setting" (YES in step S2315), to step S2316.

If the container has "mirror reverse permission setting" in step S2315, the layout editing application 121 reverses a mirror-reversible content which is connected to the link whose "margin ignoring setting" is ON. The layout editing application 121 searches for a position where the distance between contents after reverse becomes a minimum distance Lmin2 (step S2316).

The layout editing application 121 compares the minimum distances Lmin1 and Lmin2, decides a content direction corresponding to a shorter distance, and decides a link position (step S2317, (3) of FIG. 23).

The layout editing application 121 moves the link to the set link position (step S2318, (4) of FIG. 23).

The layout editing application 121 executes layout calculation to finalize the positions and sizes of the containers (step S2319). Thereafter, the layout editing application 121 displays (previews) the layout result (step S2320, (4) of FIG. 23).

As described above, according to the third embodiment, in addition to the effects described in the second embodiment, contents are laid out in a content direction corresponding to a minimum one of distances between the contents before and after mirror reverse.

Containers and contents can be laid out so that the distance between the contents becomes more preferable and minimum.

The third embodiment has exemplified a case wherein the content direction is mirror-reversed. However, the present invention is not limited to this, and the content direction may be vertically reversed or rotated through an arbitrary angle.

Fourth Embodiment

The fourth embodiment is an application of the first to third embodiments. The fourth embodiment will describe a configuration in which display of each container is controlled depending on whether a container which is enlarged/reduced in size in accordance with contents flowed into the container temporarily laid out in a document is fitted in the document.

A process executed by a variable printing system according to the fourth embodiment will be explained with reference to FIGS. 25 and 26.

Figure 25:
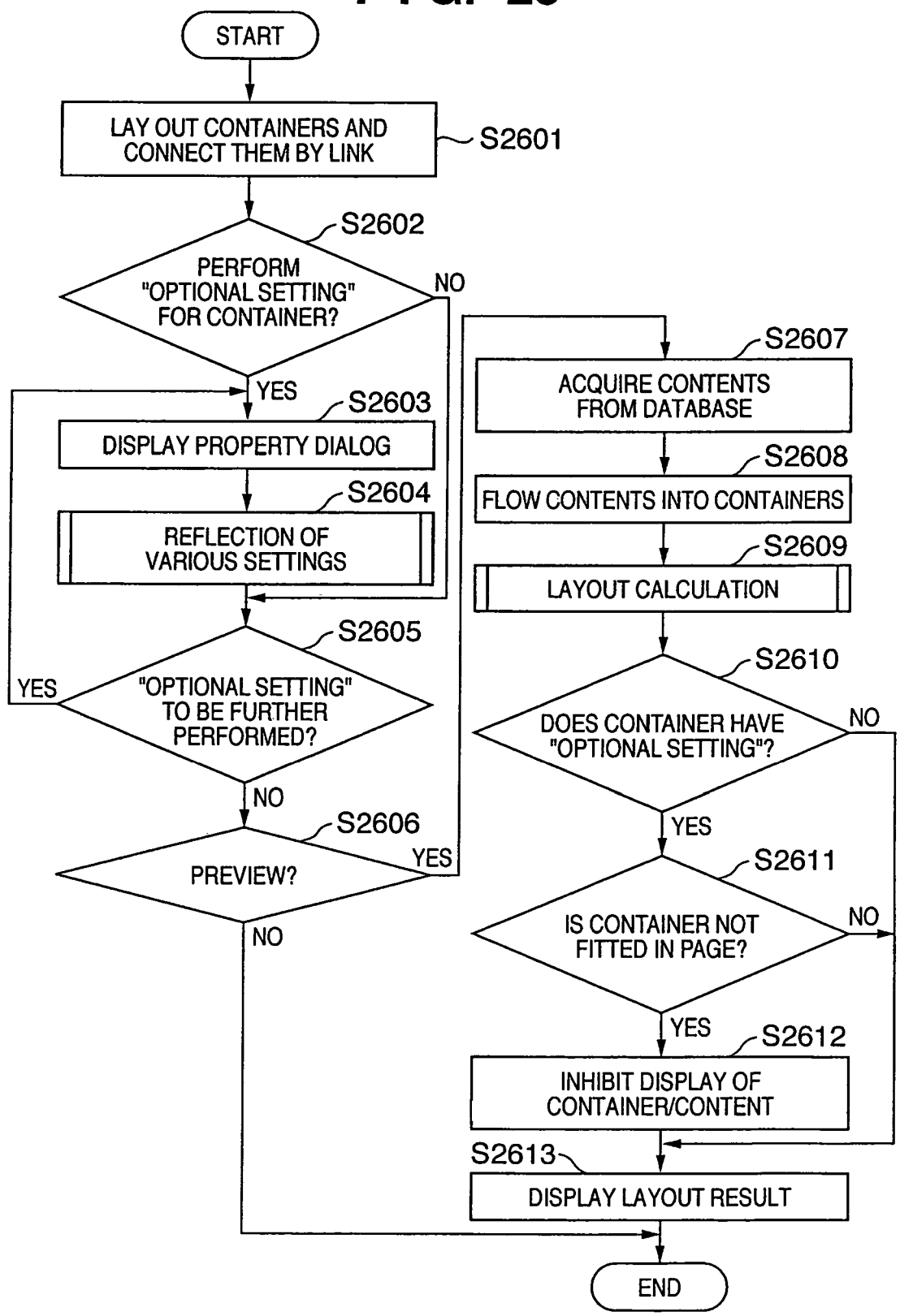
FIG. 25 is a flowchart showing a process executed by a variable printing system according to the fourth embodiment of the present invention.

FIG. 25 is a flowchart showing the process executed by the variable printing system according to the fourth embodiment of the present invention. FIG. 26 is a view for explaining a concrete example of the process executed by the variable printing system according to the fourth embodiment of the present invention.

The operator lays out containers on a page, and connects them by a link (step S2601). In (1) of FIG. 26, containers 2601 to 2603 are laid out on a page 2600, and connected by links 2610 and 2620.

A layout editing application 121 determines whether to perform "optional setting" operation for the container (step S2602). If no "optional setting" operation is performed (NO in step S2602), the flow advances to step S2605; if "optional setting" operation is performed (YES in step S2602), to step S2603. In (1) of FIG. 26, "optional setting" operation is performed for the container 2603.

Note that the operator can select a container subjected to "optional setting" by, e.g., operation of a mouse 133 and execute "optional setting". As the selection & setting method, "optional properties" are selected and set on a context menu which appears in response to, e.g., right clicking of the mouse 133.

If the layout editing application 121 determines in step S2602 to perform "optional setting" operation, it displays an optional property dialog (step S2603).

An example of the optional property dialog will be explained with reference to FIG. 27.

FIG. 27 is a view showing an example of the optional property dialog according to the fourth embodiment of the present invention.

As shown in FIG. 27, an optional property dialog 2600 provides a check box for selecting "set optional container." as optional setting.

For example, the operator selects the check box "set optional container." in the optional property dialog 2600. After the optional property dialog 2600 is closed, various settings are reflected in a page on the basis of the selected content (in this case, the optional attribute is set ON and saved for a container to be processed) (step S2604).

The process up to this step is the optional setting process for a container. Since the operator may want to make optional setting for another container, the layout editing application 121 determines whether to perform "optional setting" operation for another container (step S2605). If "optional setting" operation is performed (YES in step S2605), the process returns to step S2603 to execute the same process. If no "optional setting" operation is performed (NO in step S2605), the flow advances to step S2606.

The layout editing application 121 determines whether to preview the document (step S2606). If no document is previewed (NO in step S2606), the process ends; if the document is previewed (YES in step S2606), the flow advances to step S2607.

The process from step S2607 is a preview process.

The layout editing application 121 acquires contents from the database (step S2607).

The layout editing application 121 executes a process of flowing the acquired contents into respective containers (step S2608). The layout editing application 121 executes layout calculation to temporarily finalize the positions and sizes of the containers (step S2609).

The layout editing application 121 determines whether the container to be processed has "optional setting" (step S2610). If no container has "optional setting" (NO in step S2610), the flow advances to step S2613; if the container has "optional setting" (YES in step S2610), to step S2611.

If the container has "optional setting", the layout editing application 121 determines whether the container to be processed is fitted in the page (step S2611).

If the container is fitted in the page (YES in step S2611), the layout editing application 121 displays containers in the page and contents in the containers on the basis of the layout result obtained in step S2609 (step S2613, (2) of FIG. 26).

If no container is fitted in the page (NO in step S2611), the layout editing application 121 executes a display inhibition process of inhibiting display of the container and a content in the container on the page (step S2612). In this case, each container in the page and a content in the container are displayed on the basis of the layout result obtained in step S2609, the display-inhibited container, and the content in the container (step S2613, (2)' of FIG. 26).

As described above, according to the fourth embodiment, when a content is flowed into a container in a page and is not fitted in the page, display of the content is inhibited.

That is, when only part of a content can be displayed, display of the content can be inhibited to output a preferable page natural to the operator.

Needless to say, the first to fourth embodiments can be arbitrarily combined in accordance with the application purpose. For example, when the first embodiment and the second or third embodiment are combined, layout control of minimizing the distance between contents while deleting a margin from a content can be implemented.

In the first to fourth embodiments, detection of a margin region in a content (in other words, detection of a region of interest in the content) is based on the background color of a document. However, the present invention is not limited to this.

For example, a region of interest in a content or a margin region in a content may be detected using a well-known block selection process or an ROI (Region Of Interest) detection process.

In the block selection process, for example, contents to be processed are recognized as clusters of significant objects. The attribute (e.g., text/picture/photo/line/table) of each block is determined, and the contents are divided into blocks having different attributes.

An embodiment of the block selection process is as follows.

A content (image) to be processed is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A flat pixel cluster is defined as a line region. A range of a black pixel cluster which neatly contains rectangular white pixel clusters with a predetermined size or more is defined as a table block. A region where indefinite pixel clusters scatter is defined as a photo region. A pixel cluster with another arbitrary shape is defined as a picture block.

When the block selection process is utilized in margin region detection according to the embodiments of the present invention, a photo block or picture block obtained from a content by the block selection process is detected as a region of interest, and the remaining region is detected as a margin region. The above-described embodiments can, therefore, be implemented.

It is also possible to detect a text block or table block other than a photo block or picture block as a region of interest, and detect the remaining region as a margin region.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-029831, filed Feb. 4, 2005, which is hereby incorporated by reference herein in its entirety.

What is claimed is:

1. An information processing apparatus which lays out, in a page, field regions for inserting data, comprising:
    detection means for detecting a region of interest in image data to be inserted into a first field region in the page;
    deleting means for deleting a region different from the region of interest in the image data detected by said detection means;
    layout means for laying out the image data of the region of interest that is not deleted by said deleting means in the first field region in the page;
    moving means for moving the first field region in which the image data of the region of interest is inserted so as to bridge a space generated by laying out the image data of the region of interest in the first field region;
    setting means for setting a link to connect the first field region and a second field region; and
    rotating means for rotating image data of a region of interest inserted into the second field region through an arbitrary angle,
    wherein said layout means lays out the image data of the region of interest rotated through the arbitrary angle in the second field region when a first distance is shorter than a second distance,
    wherein the first distance is a distance between image data of the region of interest inserted into the first field region and image data of the region of interest rotated through the arbitrary angle and inserted into the second field region, and
    wherein the second distance is a distance between image data of the region of interest inserted into the first field region and image data of the region of interest inserted into the second field region before being rotated through the arbitrary angle.

2. A method of controlling an information processing apparatus which lays out, in a page, field regions for inserting data, comprising:
    a detection step of detecting a region of interest in image data to be inserted into a first field region in the page; and
    a deleting step of deleting a region different from the region of interest in the image data detected in said detection step;
    a layout step of laying out the image data of the region of interest that is not deleted in said deleting step in the first field region in the page;
    a moving step of moving the first field region in which the image data of the region of interest is inserted so as to bridge a space generated by laying out the image data of the region of interest in the first field region;
    a setting step of setting a link to connect the first field region and a second field region; and
    a rotating step of rotating image data of a region of interest inserted into the second field region through an arbitrary angle,
    wherein said layout step lays out the image data of the region of interest rotated through the arbitrary angle in the second field region when a first distance is shorter than a second distance,
    wherein the first distance is a distance between image data of the region of interest inserted into the first field region and image data of the region of interest rotated through the arbitrary angle and inserted into the second field region, and
    wherein the second distance is a distance between image data of the region of interest inserted into the first field region and image data of the region of interest inserted into the second field region before being rotated through the arbitrary angle.

3. A tangible computer-readable storage medium product storing a program for implementing control of an information processing apparatus which lays out, in a page, field regions for inserting data, comprising:
    a program code for a detection step of detecting a region of interest in image data to be inserted into a first field region in the page;

a program code for a deleting step of deleting a region different from the region of interest in the image data detected in said detection step;

a program code for a layout step of laying out the image data of the region of interest that is not deleted in said deleting step in the first field region in the page;

a program code for a moving step of moving the first field region in which the image data of the region of interest is inserted so as to bridge a space generated by laying out the image data of the region of interest in the first field region;

a program code for a setting step of setting a link to connect the first field region and a second field region; and a program code for a rotating step of rotating image data of a region of interest inserted into the second field region through an arbitrary angle, wherein said layout step lays out the image data of the region of interest rotated through the arbitrary angle in the second field region when a first distance is shorter than a second distance, wherein the first distance is a distance between image data of the region of interest inserted into the first field region and image data of the region of interest rotated through the arbitrary angle and inserted into the second field region, and wherein the second distance is a distance between image data of the region of interest inserted into the first field region and image data of the region of interest inserted into the second field region before being rotated through the arbitrary angle.

* * * * *